(12) United States Patent
Nykamp et al.

(10) Patent No.: US 10,015,928 B2
(45) Date of Patent: **\*Jul. 10, 2018**

(54) METHOD AND STEREO VISION SYSTEM FOR MANAGING THE UNLOADING OF AN AGRICULTURAL MATERIAL FROM A VEHICLE

(71) Applicant: Deere & Company, Moline, IL (US)

(72) Inventors: Alex J. Nykamp, Urbandale, IA (US); Zachary T. Bonefas, Grimes, IA (US)

(73) Assignee: DEERE & COMPANY, Moline, IL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/337,577

(22) Filed: Oct. 28, 2016

(65) Prior Publication Data
US 2017/0055446 A1 Mar. 2, 2017

Related U.S. Application Data

(63) Continuation-in-part of application No. 14/822,228, filed on Aug. 10, 2015, now Pat. No. 9,642,305.

(51) Int. Cl.
*G06F 19/00* (2018.01)
*A01D 43/073* (2006.01)
(Continued)

(52) U.S. Cl.
CPC .......... *A01D 43/073* (2013.01); *A01D 43/087* (2013.01); *B60R 1/00* (2013.01); *B60R 2300/107* (2013.01)

(58) Field of Classification Search
CPC ...... A01D 43/073; A01D 43/087; B60R 1/00; B60R 2300/107
(Continued)

(56) References Cited

U.S. PATENT DOCUMENTS 8,649,940 B2 \* 2/2014 Bonefas ................. B62D 12/02
348/143
2013/0211675 A1 8/2013 Bonefas
(Continued)

FOREIGN PATENT DOCUMENTS

DE 102008002006 A1 12/2009
EP 2020174 A1 2/2009
(Continued)

OTHER PUBLICATIONS

IntelliFill™ System, New Holland Agriculture, 2016 [online] [retrieved on Apr. 1, 2016]. Retrieved from the Internet <URL: http://agriculture1.newholland.com/eu/en-uk/about-us/new-holland/excellence>.

(Continued)

*Primary Examiner* — Gertrude Arthur Jeanglaude

(57) ABSTRACT

A spout identification module is adapted to identify a spout (e.g., or an associated spout position) of the harvesting vehicle in the collected image data. A relative motion detector detects the relative motion of a receiving vehicle and the harvesting vehicle or detects the relative motion between the spout and a container of the receiving vehicle. An alignment module is adapted to determine the relative position of the spout and the cells in the container via processing of the image data such that the spout is aligned with the longitudinal axis or a lateral offset from the longitudinal axis based on the detected relative motion and where a longitudinal size of the deadband volume is adjusted based on the relative motion.

24 Claims, 14 Drawing Sheets

(51) Int. Cl.
*B60R 1/00* (2006.01)
*A01D 43/08* (2006.01)

(58) Field of Classification Search
USPC ............. 701/23, 41, 25, 50; 172/4.5, 9
See application file for complete search history.

(56) References Cited

U.S. PATENT DOCUMENTS

2013/0213518 A1    8/2013   Bonefas
2014/0083556 A1    3/2014   Darr et al.

FOREIGN PATENT DOCUMENTS

| EP | 2266383 A1 | 12/2010 |
|----|------------|---------|
| EP | 2301318 B1 | 11/2011 |
| EP | 2510775 A1 | 10/2012 |
| EP | 2509404 B1 | 3/2014 |
| GB | 2517049 A | 2/2015 |
| GB | 2525260 A | 10/2015 |

OTHER PUBLICATIONS

Search Report issued in counterpart application No. EP16199952.9, dated Jul. 3, 2017 (10 pages).

\* cited by examiner

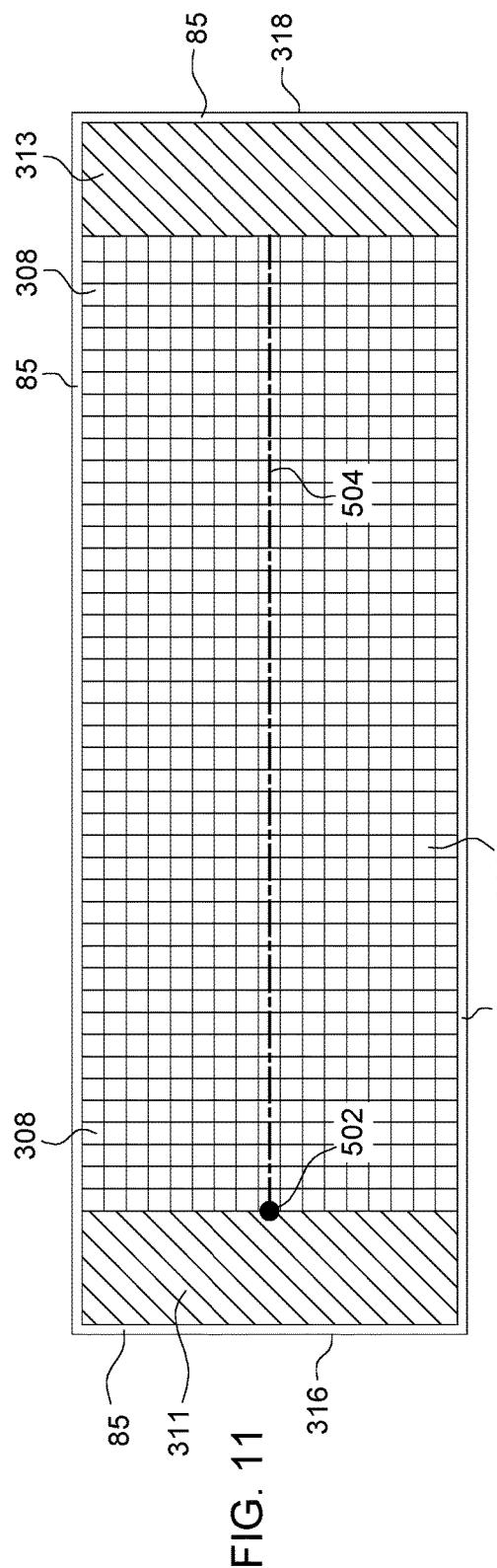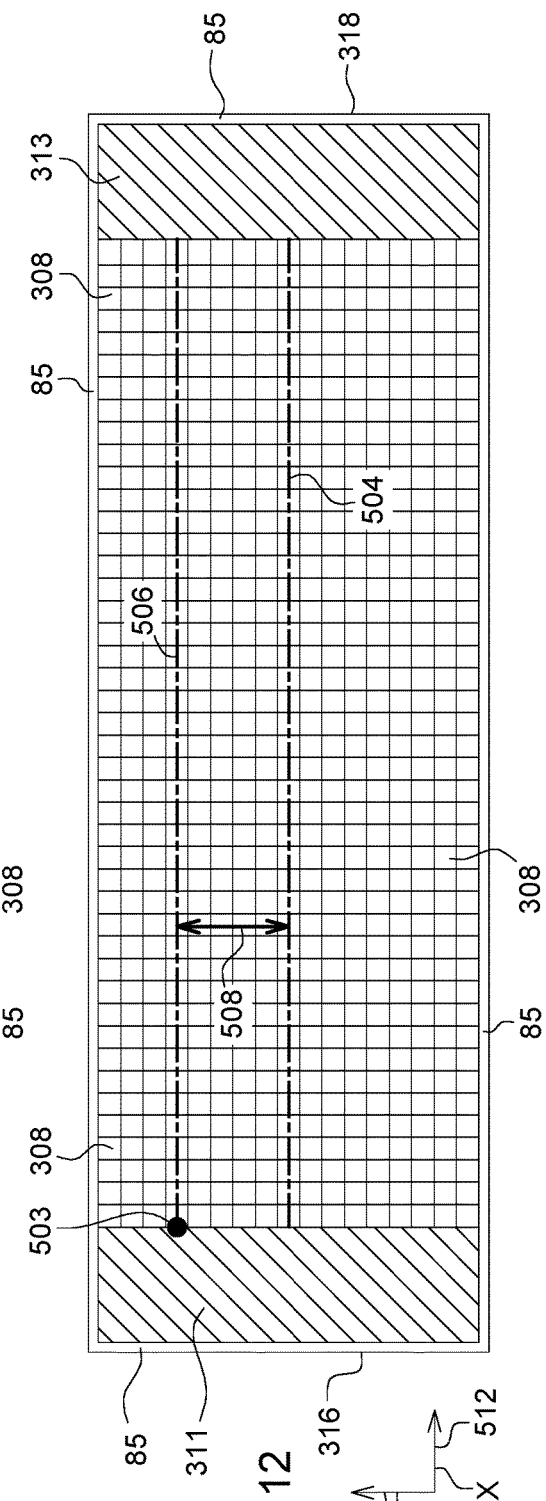

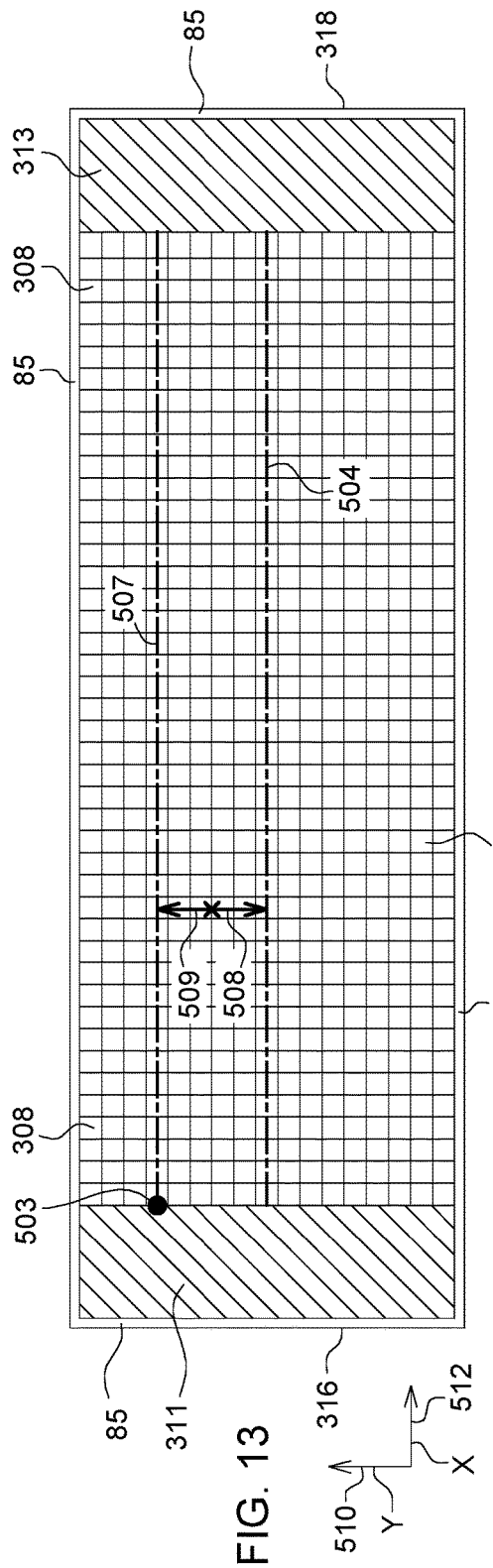
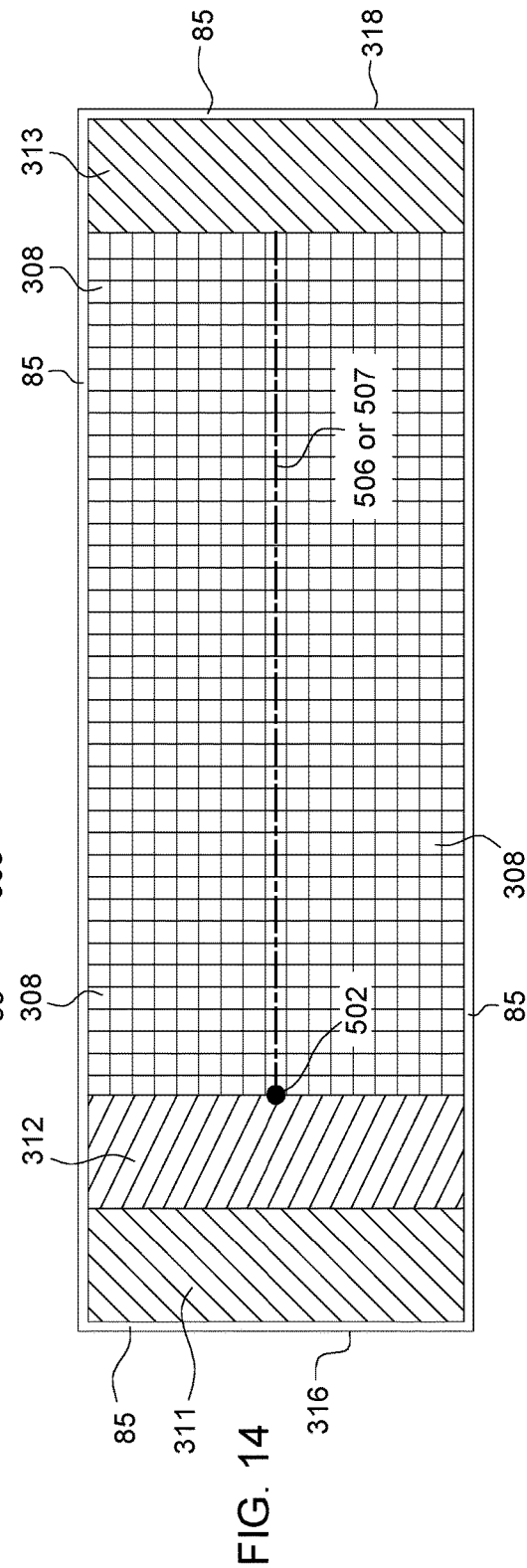
FIG. 13
FIG. 14

METHOD AND STEREO VISION SYSTEM FOR MANAGING THE UNLOADING OF AN AGRICULTURAL MATERIAL FROM A VEHICLE

RELATED APPLICATION

This is a continuation-in-part of U.S. non-provisional application Ser. No. 14/822,228, filed on Aug. 10, 2015, which is incorporated by reference herein.

FIELD OF THE INVENTION

This invention relates to a method and stereo vision system for managing the unloading of agricultural material from a vehicle.

BACKGROUND

Certain prior art systems may attempt to use global positioning system (GPS) or other global navigation satellite system (GNSS) receivers to maintain proper spacing between two vehicles during the unloading or transferring of an agricultural material between the vehicles. Other prior art systems may use an imaging system to maintain the proper spacing between the vehicles or to control the unloading process. The storage area in the recipient vehicle receiving agricultural material may not be filled to full capacity or material may fall outside of the container unless the vehicle operators or control scheme precisely coordinate the position of the spout that fills the agricultural material. Thus, there is a need for an improved system for managing the unloading of agricultural material from a vehicle to ensure that the storage area of the recipient vehicle is fully loaded or material is not spilled.

SUMMARY OF THE INVENTION

The system and method facilitates the transfer of agricultural material from a transferring vehicle (e.g., harvesting vehicle) to a receiving vehicle. The system and method comprises a receiving vehicle, which has a propelled portion for propelling the receiving vehicle and a container for storing agricultural material. A stereo imaging device faces towards the container of the vehicle. The imaging device can collect image data. A spout identification module is adapted to identify a spout (e.g., or an associated spout position) of the harvesting vehicle in the collected image data. A relative motion detector (e.g., relative velocity detector) detects the relative motion (or relative velocity) of the receiving vehicle and the harvesting vehicle or detects the relative motion (or relative velocity) between the spout and the container of the receiving vehicle. An alignment module is adapted to determine the relative position of the spout and the cells in the container via processing of the image data such that the spout is aligned with the longitudinal axis or a lateral offset from the longitudinal axis based on the detected relative motion (e.g., detected relative velocity) and where a longitudinal size of the deadband volume is adjusted based on the detected relative motion (e.g., detected relative velocity).

BRIEF DESCRIPTION OF THE DRAWINGS

FIG. 11 shows a plan view of the container that is filled with material in accordance with the method of FIG. 8 or variants thereof.

FIG. 12 shows a plan view of the container that is filled with material in accordance with the method of FIG. 8 or variants thereof.

FIG. 13 shows a plan view of the container that is filled with material in accordance with the method of FIG. 8 or variants thereof.

FIG. 14 shows a plan view of the container that is filled with material in accordance with the method of FIG. 8 or variants thereof.

In all of the drawings, like reference numbers indicate like elements, steps or procedures.

DESCRIPTION OF THE PREFERRED EMBODIMENT

Figure 1:
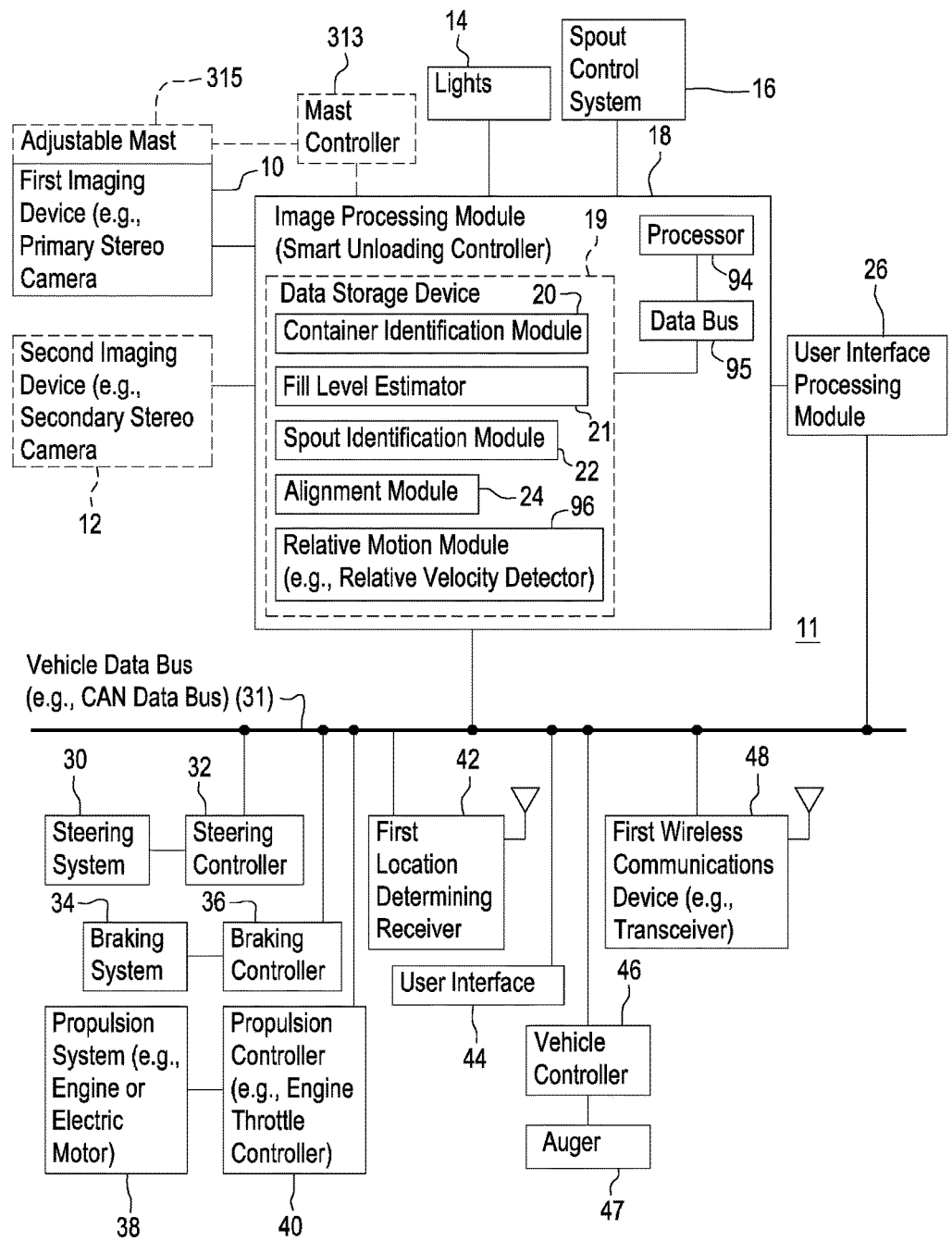
FIG. 1 is a block diagram of one embodiment of a stereo vision system for a transferring vehicle for managing the unloading of agricultural material from the transferring vehicle (e.g., combine).
Figure 4A:
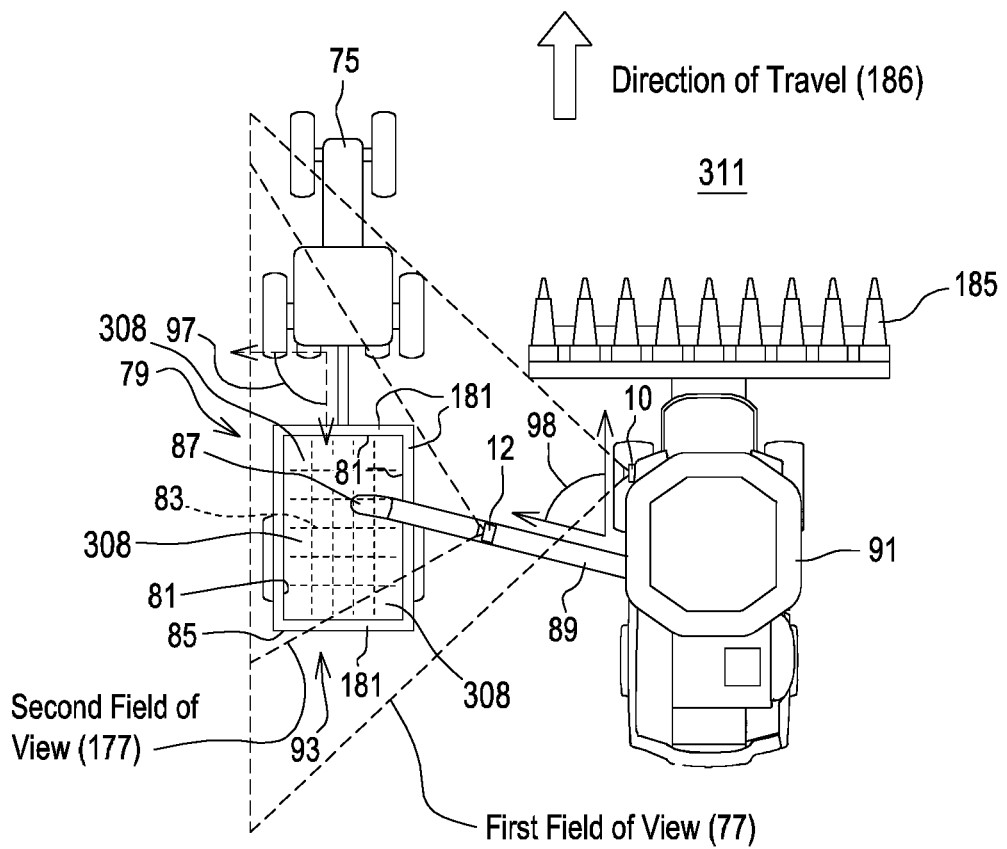
FIG. 4A is one embodiment of a plan view of a stereo vision system mounted on a transferring vehicle (e.g., combine) and facing a receiving vehicle.

In accordance with one embodiment, FIG. 1 shows a system 11 of vehicle electronics for a transferring vehicle for managing the unloading of agricultural material from the transferring vehicle (e.g., combine) to a receiving vehicle (e.g., grain cart or wagon). FIG. 4A provides an illustrative example of a plan view of a stereo or other vision system, such as system 11 of FIG. 1, mounted on a transferring vehicle (e.g., combine) and facing a receiving vehicle. As used in this document, "adapted to" is synonymous with configured to or arranged to and may refer to software instructions or program instructions to be executed by a controller, computer, data processor or module, a combination of hardware electronics and software, or any arrangement or configuration that is capable of performing a particular referenced function.

In one embodiment, the system 11 comprises a first imaging device 10 and second imaging device 12 coupled to an image processing module 18. The first imaging device 10 may comprise a primary stereo camera, while the second imaging device 12 may comprise a secondary stereo camera. In one configuration, the second imaging device 12 or secondary stereo camera is optional and provides redundancy to the first imaging device 10 in case of failure, malfunction or unavailability of image data from the first imaging device 10. In another configuration, the first imaging device 10 or the second imaging device 12 is mounted on a mast, a telescopic mast, a manually telescopic mast, a retractable mount, a rotatable mount (e.g., with remote control of the rotation angle), a pivotable arm (e.g., with manual or remotely controlled tilt and pan adjustment), or another support on the receiving vehicle, where any remotely actuated height, angular rotation or other adjustment of the mount by a mount actuator can be used to keep the storage portion 93 or container 85 (or its interior or its contents) within a field of view of the first imaging device 10 or the second imaging device 12. For example, the first imaging device 10 or the second imaging device 12 is mounted at sufficiently high elevation above ground level to have some visibility into the container 85 (e.g., grain cart), or sufficient visibility of the interior of the container 85 and its contents, to determine a profile, distribution or level of agricultural material (e.g., grain) within a volume or portion (e.g., cell) of the volume defined by the container 85.

The image processing module 18 may be coupled, directly or indirectly, to lights 14 on a vehicle (e.g., transferring vehicle) for illumination of a storage container 93, its contents (e.g., agricultural material) and/or spout (e.g., 89 in FIG. 4A), or for illumination of a field of view of the first imaging device 10, the second imaging device 12, or both for acquiring raw images (e.g., of sufficient brightness, contrast and color reproduction). For example, the image processing module 18 may control drivers or switches, which in turn control the activation or deactivation of lights 14 on the transferring vehicle. The image processing module 18 may activate the lights 14 on the vehicle for illumination of the storage container (e.g., 85 in FIG. 4A), its contents, or its spout 89 or any combination of the foregoing items, if a light meter indicates that an ambient light level is below a certain minimum threshold. In one configuration, the light meter comprises a photo-sensor, photo-resistor, photo-sensitive device, or a cadmium-sulfide cell.

In one embodiment, the spout control system 16 may comprise: (1) a rotation angle sensor for sensing a spout rotation angle (e.g., 98 in FIG. 4A) or other spout angles of the spout 89 with respect to one or more axes of rotation and (2) an actuator (e.g., spout actuator or adjuster) for moving the spout 89 to change the spout rotation angle or other spout angles; hence, the spout position with respect to the receiving vehicle 79 or its storage container 85. The actuator of the spout control system 16 may comprise one or more motors, a linear motor, an electro-hydraulic device, a ratcheting or cable-actuated mechanical device, or another device for moving the spout 89, or the spout end 87. The spout angle or spout rotation angle may comprise a simple angle, a compound angle or multi-dimensional angles that can be measured with reference to any of the following: a reference axis parallel to the direction of travel of the transferring vehicle, a generally vertical axis, a generally horizontal axis, or an axis generally orthogonal to at least one of the generally vertical axis and the generally horizontal axis.

Where the system 11 of FIG. 1 is applied to a combine or a harvester, the spout 89 may be controlled in one or more dimensions (e.g., of rotation or movement). In one configuration, the spout control system 16 (of the harvester or combine) controls a rotation angle of the spout 89 in a generally horizontal plane or about a generally vertical axis. In another configuration, the spout control system 16 or spout controller may control one or more of the following angles: (1) rotation angle 98 of the spout 89 in a generally horizontal plane, (2) tilt angle of the spout 89 in a relatively vertical plane, and (3) flap angle (e.g., discharge member angle), where the rotation angle, tilt angle and flap angle are associated with different axes (e.g., mutually orthogonal axes). In practice, the discharge member and the associated adjustable discharge member angle or adjustable flap angle is typically associated with a forage harvester spout or chute, but not a combine spout. In one configuration, by controlling the rotation angle 98, the spout control system 16 or vehicle controller 46 may automatically extend or retract the spout 89 (e.g., unloading auger arm) when appropriate (e.g., when unloading of the agricultural material is complete).

The vehicle controller 46 controls the rotation of the auger 47 for transfer or movement of the agricultural material from the transferring vehicle 91 to the receiving vehicle 79. The vehicle controller 46 can provide a data message that indicates when the auger 47 for unloading agricultural material from the transferring vehicle is activate and inactive. The auger 47 may comprise an auger, an electric motor for driving the auger, and a rotation sensor for sensing rotation of the auger or its associated shaft. In one embodiment, the auger 47 is associated with a container 85 for storing agricultural material (e.g., a grain tank) of a transferring vehicle 91 (e.g., a combine).

If the vehicle controller 46 indicates that the auger 47 of the transferring vehicle is rotating or active, the imaging processing module 18 activates the spout identification module 22 and container identification module 20. Thus, the vehicle controller 46 may conserve data processing resources or energy consumption by placing the container identification module 20 and the spout identification module 22 in an inactive state (or standby mode) while the transferring vehicle is harvesting, but not unloading, the agricultural material to the receiving vehicle.

If the image processing module 18, a fill level estimator 21, or another sensor determines that the container 85 or storage portion 93 has reached a target fill level (e.g., a first target level (e.g., 310 in FIG. 4C), a second target level (e.g. 312 in FIG. 4C), or full or some percentage or fraction of capacity), the image processing module 18, vehicle controller 46, or spout control system 16 may automatically shut off the unloading auger 47. The first target level may comprise a base fill level, whereas the second target level may comprise a top-off fill level that ensures completeness and efficiency of each load of the container (85), which can facilitate the reduction in the total number of loads to transport the harvest of any given field; hence a potential, commensurate reduction in fuel costs for the receiving vehicle 79.

The imaging processing module 18 may comprise a data processor, controller, a microcomputer, a microprocessor, a microcontroller, an application specific integrated circuit, a programmable logic array, a logic device, an arithmetic logic unit, a digital signal processor, or another electronic data processor and supporting electronic hardware and software. For example, the image processing module 18 may comprise an electronic data processor 94 and a data storage device 19 that are coupled to a data bus 95. In one embodiment, the image processing module 18 comprises a container identification module 20, a spout identification module 22, a fill level estimator 21, and an alignment module 24.

The image processing module 18 may be associated with a data storage device 19. The data storage device 19 may comprise electronic memory, non-volatile random access memory, a magnetic disc drive, an optical disc drive, a magnetic storage device or an optical storage device, for example. If the container identification module 20, the spout identification module 22, the fill level estimator 21, the alignment module 24, and the relative motion module 96 (e.g., relative velocity detector) are software modules, they are stored within the data storage device 19. The software modules may comprise files, executable files, libraries, data records or software instructions that the image processing module 18 or its electronic data processor can execute. The data processor of the image processing module 18 may communicate with a data storage device 19, or its software modules or its contents via one or more data buses.

In one embodiment, the relative motion module 96 can detect or process relative motion. In this document, relative motion can mean: (1) the relative velocity, the relative acceleration, or both of the receiving vehicle and the harvesting vehicle, or (2) the relative velocity, the relative acceleration, or both between the spout end and the container of the receiving vehicle, among other things. For instance, the relative motion measures a first difference between the observed velocity of the transferring vehicle (or its spout end, 87, 187) and the observed velocity of the receiving vehicle (or its container 85) during a sampling interval or time period; the relative motion measures a second difference between the observed velocity of the transferring vehicle (or its spout end, 87 or 187) and the receiving vehicle (or its container 85) during a sampling interval or time period.

The container identification module 20 identifies a set of two-dimensional or three dimensional points (e.g., in Cartesian coordinates or Polar coordinates) in the real world that define at least a portion of the container perimeter (e.g., 81 in FIG. 4A) of the storage portion (e.g., 85 in FIG. 4A). The set of two-dimensional or three dimensional points correspond to pixel positions in images collected by the first imaging device 10, the second imaging device 12, or both. The container identification module 20 may use or retrieve container reference data.

The container reference data comprises one or more of the following: reference dimensions, reference shape, drawings, models, layout, and configuration of the container 85, the container perimeter 81, the container edges 181; reference dimensions, reference shape, drawings, models, layout, and configuration of the entire storage portion 93 of receiving vehicle; storage portion wheelbase, storage portion turning radius, storage portion hitch configuration of the storage portion 93 of the receiving vehicle. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the transferring vehicle system 11. For each receiving vehicle identifier, there can be a corresponding unique container reference data stored therewith in the data storage device 19.

In one embodiment, the transferring vehicle (91 or 191) receives a data message from the receiving vehicle in which a vehicle identifier of the receiving vehicle is regularly (e.g., periodically transmitted). In another embodiment, the transferring vehicle interrogates the receiving vehicle for its vehicle identifier or establishes a communications channel between the transferring vehicle and the receiving vehicle in preparation for unloading via the wireless communication devices (48, 148). In yet another embodiment, the receiving vehicle transmits its vehicle identifier to the transferring vehicle (91 or 191) when the receiving vehicle 79 approaches the transferring vehicle within a certain radial distance. In still another embodiment, only one known configuration of receiving vehicle 79 is used with a corresponding transferring vehicle and the container reference data is stored or saved in the data storage device 10. In the latter embodiment, the transferring vehicle is programmed, at least temporarily, solely for receiving vehicles with identical containers, which are identical in dimensions, capacity, proportion and shape.

If the linear orientation of a set of pixels in the collected image data conforms to one or more edges 181 of the perimeter (81 in FIG. 4A) of the container (85 in FIG. 4A) as prescribed by the container reference data, the position of the container has been identified. A target fill zone of the container opening 83 of the container 85 can be identified by dividing the distance (e.g., shortest distance or surface normal distance) between opposite sides of the container into a number of cells 308 of substantially equal volumes, substantially equal dimensions, or columnar rectangular cells of equal length and width (e.g., but with a height that is different from the length and width), among other possibilities.

The spout identification module 22 identifies one or more of the following: (1) the spout pixels on at least a portion of the spout 89 (FIG. 4A) or spout 189 (FIG. 4B), or (2) spout end pixels that are associated with the spout end (87, 187) of the spout (89 or 189). The spout identification module 22 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout (89, 189) or on the spout end (87, 187) of the spout (89, 189) for identification purposes.

In one embodiment, a fill level estimator 21 is configured to estimate a plurality of fill levels of a plurality of corresponding subdivided volumes or cells 308 of the storage portion 93 or container 85. Each fill level is associated with a respective height of the agricultural material in a corresponding cells of the storage portion 93 or container 85. The fill level estimator 21 may use color discrimination, intensity discrimination, or texture discrimination to identify background pixels (e.g., container, ground, or sky pixels) from one or more selected pixels of agricultural material with associated pixel patterns or attributes (e.g., color or color patterns (e.g., Red Green Blue (RGB) pixel values), pixel intensity patterns, texture patterns, luminosity, brightness, hue, or reflectivity. The image processing module 18 or fill level estimator 21 determines the three dimensional locations or vertical heights of the selected or identified pixels (e.g., identified by color discrimination, intensity discrimination, or texture discrimination) of the agricultural material or adjacent groups of pixels of the agricultural material. Further, the image processing module 18 or fill level estimator 21 may assign cells or cell identifiers to groups of adjacent pixels within the container or storage portion based on the two or three dimensional locations or coordinates of the pixels, or relative locations of the pixels within the container 93 or storage portion 85.

In one embodiment, the alignment module 24 may comprise: (1) a relative vehicle alignment module for positional alignment between the transferring vehicle (91 or 191) and the receiving vehicle 79 (or its container 85), or (2) a spout-to-container alignment module, or both. The relative vehicle alignment module or alignment module 24 estimates motion commands at regular intervals to maintain alignment of the spout (89, 189) over a target fill zone (e.g., a target fill zone, target cells, or partially full or empty cells) of the container 85 for unloading agricultural material. The relative vehicle alignment module or alignment module 24 may send data or commands wirelessly from the transferring vehicle (91 or 191) with respect to its speed, velocity, acceleration or heading (or its relative speed, velocity, acceleration, or heading to the receiving vehicle 79) to electronics (e.g., in FIG. 3) of the receiving vehicle (79) maintain alignment of the position of the transferring vehicle (91, 191) with respect to the receiving vehicle. For example, the relative vehicle alignment module or alignment module 24 may transmit a steering command or heading command to the steering controller 32, a braking or deceleration command to a braking system 34, and a propulsion, acceleration or torque command to a propulsion controller 40 of the transferring vehicle (91, 191). Further, similar command data may be transmitted via the wireless communication devices (48, 148) to the receiving vehicle for observational purposes or control of the receiving vehicle via its steering system controller 32, its braking controller 36, and its propulsion controller 40 of the system 211 of FIG. 3. In one configuration, the relative vehicle alignment module or alignment module 24 transmits a steering command or heading command to the steering controller 32, a braking or deceleration command to a braking system 34, and a propulsion, acceleration or torque command to a propulsion controller 40 to maintain a generally uniform spatial separation or distance between a first imaging device 10 (e.g., on the propulsion portion of the receiving vehicle or on the transferring vehicle) and the spout end 87 of the spout 89.

In one embodiment, the image processing module 18 provides image data, fill state data of respective cells 308, or other data (e.g., alert message that indicates the container is full) to a user interface processing module 26 that provides, directly or indirectly, status message data and performance message data to a user interface 44. As illustrated in FIG. 1, the image processing module 18 communicates with a vehicle data bus 31 (e.g., Controller Area Network (CAN) data bus).

In one embodiment, a first location determining receiver 42, a first wireless communications device 48, a vehicle controller 46, a steering controller 32, a braking controller 36, and a propulsion controller 40 are capable of communicating over the vehicle data bus 31. In turn, the steering controller 32 is coupled to a steering system 30 of the transferring vehicle; the braking controller 37 is coupled to the braking system 34 of the transferring vehicle; and the propulsion controller 40 is coupled to the propulsion system 38 of the transferring vehicle.

In one embodiment, the alignment module 24 or a spout-to-container alignment module determines the relative position of the spout (89, 189) and the cells 308 in the container 85 such that the spout is aligned within a target fill zone of the cells 308 in accordance with a fill sequence or fill plan instructions in which: (a) first, the alignment module 24 is adapted to direct the spout (89, 189), via the spout control system 16 alone or in combination with relative vehicle alignment, to fill the container 85 with the material in a first mode to a first target level that is less than a peak height of the container; (b) second, the fill level estimator 21 is adapted to estimate the number of cells 308 that are below the first target level after directing the spout to fill in the first mode; and (c) third, the alignment module 24 is adapted to direct the spout, via the spout control system 16 alone or in combination with relative vehicle alignment, to fill the container in the second mode to a second target level that is greater than the first target level if less than a threshold number of cells are below the first target level.

The system 11 facilitates the transfer of agricultural material from the transferring vehicle (e.g., a harvesting vehicle) to a receiving vehicle. The system 11 comprises a receiving vehicle with a propelled portion for propelling the receiving vehicle and a storage portion 93 for storing agricultural material. A stereo imaging device, such as the first imaging device 10, faces towards the storage portion 93 of the receiving vehicle. As shown in FIG. 1, the first imaging device 10 and the second imaging device 12 are mounted on the transferring vehicle, consistent with FIG. 4A.

In one embodiment, an optional mast controller 313, indicated by dashed lines, is coupled to the vehicle data bus (31, 131), the implement data bus, or the image processing module 18 to control an optional adjustable mast 315 for mounting and adjustably positioning the first imaging device 10, the second imaging device 12, or both. The mast controller 313 and its associated adjustable mast 315 are adapted to change the orientation or height above ground of the first imaging device 10, the second imaging device 12 or both (to the extent that the devices (10, 12) are mounted on the adjustable mast 315), where the orientation may be expressed as any of the following: a tilt angle, a pan angle, a down-tilt angle, a depression angle, or a rotation angle. The adjustable mast 315 may be associated with one or more servo-motors, linear motors, or other devices for controlling the movement, height and angles of imaging devices (10, 12) mounted on the adjustable mast 315. For example, an operator may control or adjust the height or orientation of one or more imaging devices (10, 12) via a user interface. In an alternate embodiment, the optional mast controller 313 and adjustable mast 315 may be replaced by a manually adjustable mast, rather than a remotely controllable adjustable mast 315.

One or more imaging devices (10, 12) are arranged to collect image data. A container identification module 20 identifies a container perimeter of the storage portion 93 in the collected image data. The storage portion 93 has an opening inward from the container perimeter for receipt of the agricultural material. A spout identification module 22 is configured to identify a spout (e.g., 89 of FIG. 4A or 189 of FIG. 4B) of the harvesting vehicle in the collected image data. An alignment module 24 is adapted for determining the relative position of the spout (89 or 189) and the container perimeter (81 of FIG. 4A) and for generating command data to the vehicle electronics of transferring vehicle (91, 191) or the propelled portion 75 of the receiving vehicle 79 to steer the storage portion 93 in cooperative alignment such that the spout 89 is aligned within a target fill zone 83 of the container perimeter 81. A steering controller 32 is associated with a steering system 30 of the propelled portion for steering the receiving vehicle in accordance with the cooperative alignment.

In one configuration, a user interface 44 is arranged for entering container reference data or dimensional parameters related to the receiving vehicle. For example, the container reference data or dimensional parameters comprise a distance between a trailer hitch (which interconnects the propulsion unit 75 and the storage portion 93) and front wheel rotational axis of the storage portion 93 of the receiving vehicle 79.

Although the first imaging device 10 and the second imaging device 12 may comprise stereo imaging devices or monocular imaging devices that are combined to provide stereo vision image data, in an alternative embodiment the first imaging device 10 and the optical second imaging device 12 may be replaced by any of the following: a range finding device, a laser scanner, a laser range finder, a Lidar (light detection and ranging system), a radar sensor (radio detection and ranging), a range finder that uses time of flight of an electromagnetic signal to establish a range to an object, or another perception device.

The system 11 of FIG. 1 is well suited for use on a combine or harvester as the transferring vehicle. The system 11 of FIG. 1 may communicate and cooperate with a second system 211 of vehicle electronics of FIG. 3 on the receiving vehicle to coordinate the relative alignment of the transferring vehicle and the receiving vehicle during unloading or transferring of material from the transferring vehicle. Like reference numbers in FIG. 1 through FIG. 3, inclusive, indicate like elements.

Figure 2:
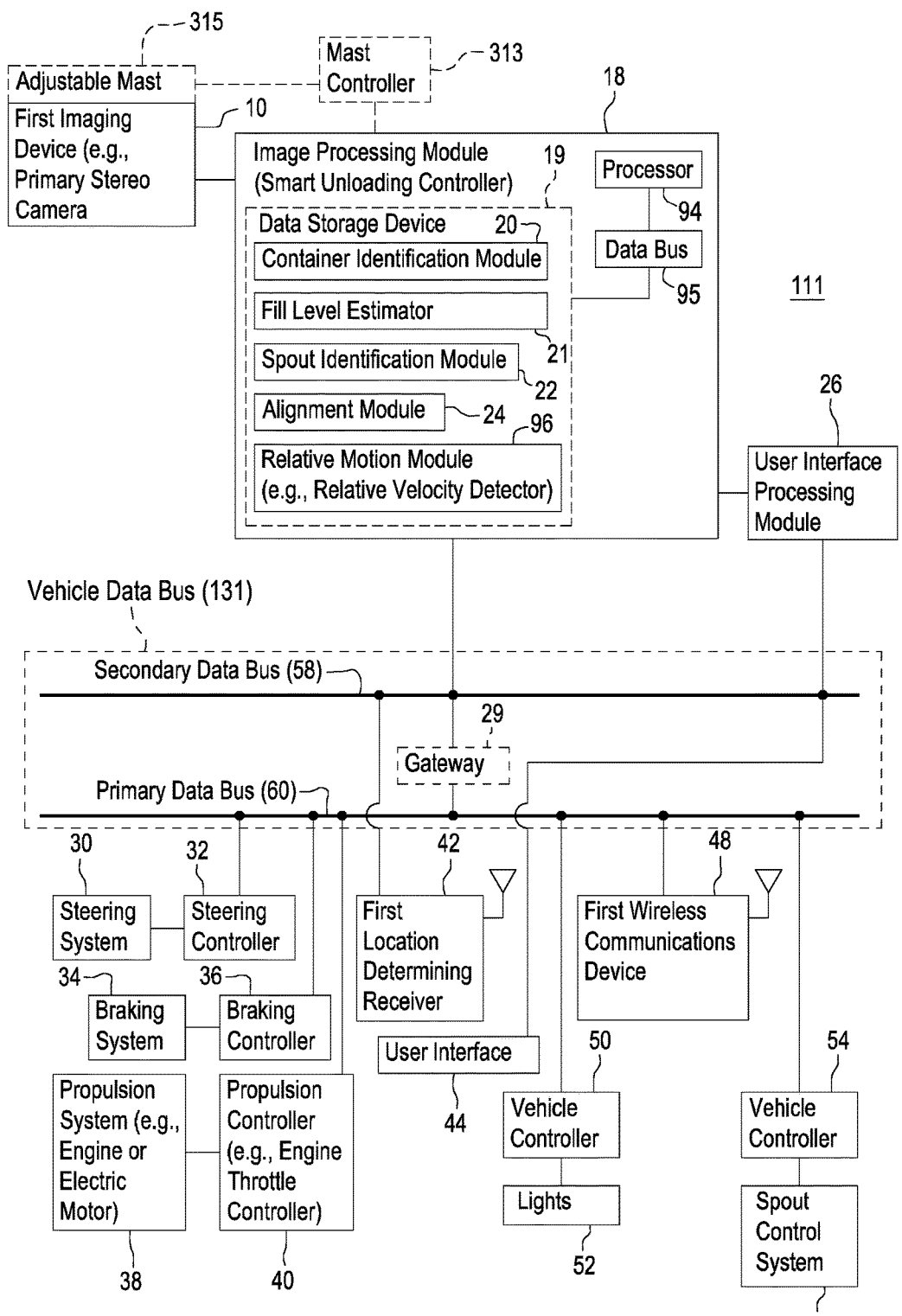
FIG. 2 is a block diagram of another embodiment of a stereo vision system for a transferring vehicle for managing the unloading of agricultural material from the transferring vehicle (e.g., a self-propelled forage harvester).
Figure 4B:
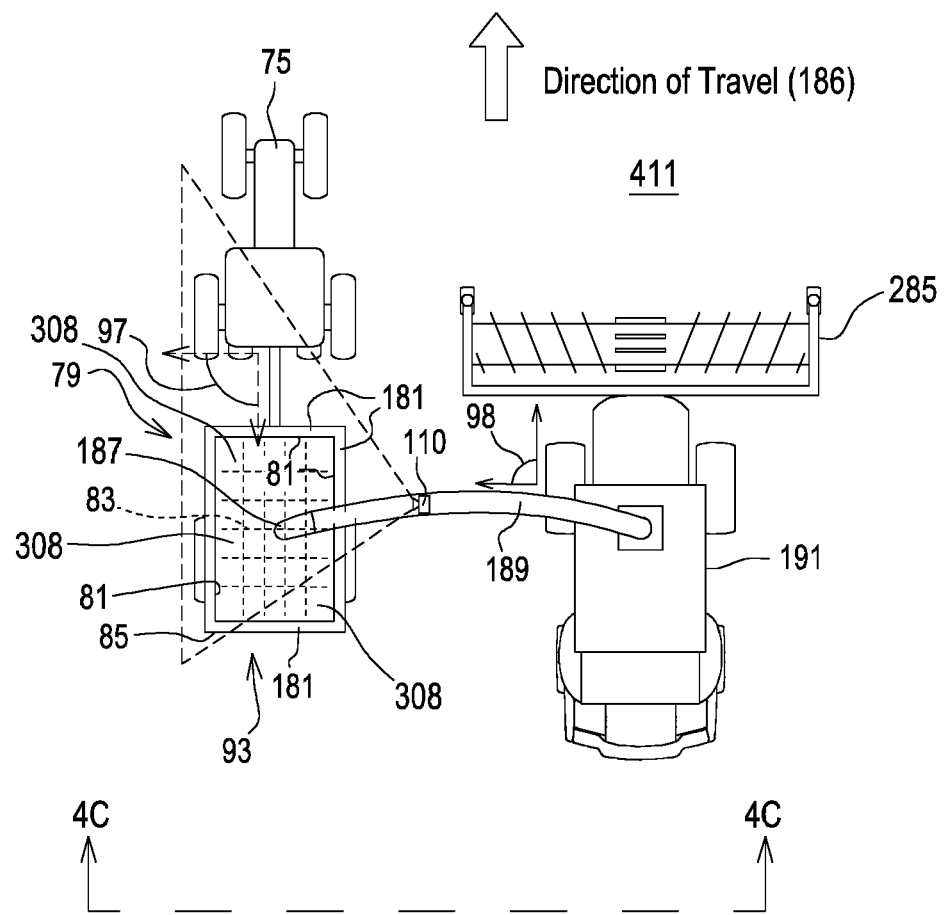
FIG. 4B is one embodiment of a plan view of a stereo vision system mounted on a transferring vehicle (e.g., self-propelled forage harvester) and facing a receiving vehicle.
Figure 4C:
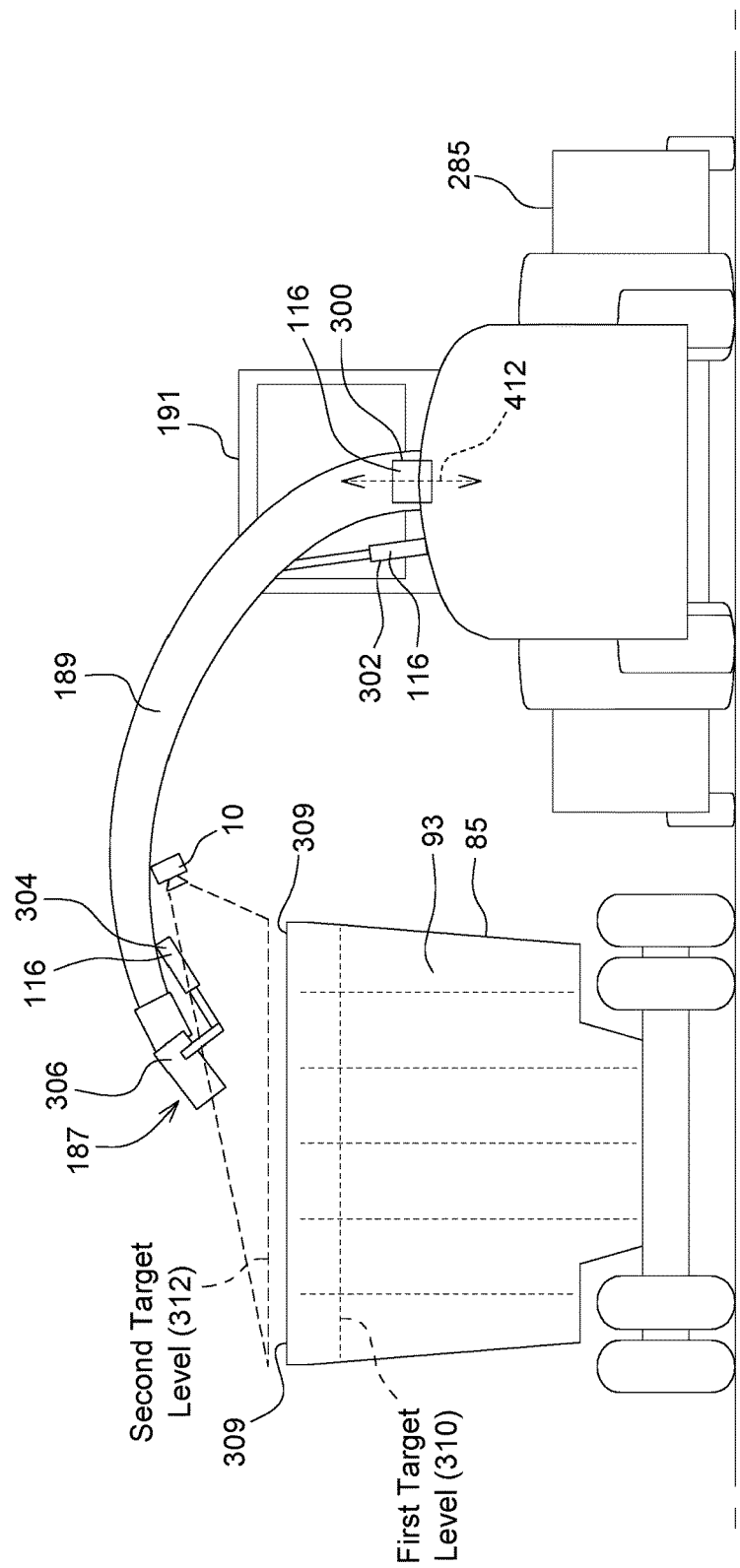
FIG. 4C is a back view of the transferring vehicle and receiving vehicle as viewed along reference line 4C-4C of FIG. 4B.

The system 111 of vehicle electronics of FIG. 2 is similar to the system 11 of FIG. 1; except that in the system 111 the vehicle data bus 31 of FIG. 1 is replaced with the vehicle data bus 131; the second imaging device 12 is deleted as shown; and the lights 52 and spout control system 116 can be controlled via respective optional vehicle controllers (50, 54) in communication with the vehicle data bus 131. Like reference numbers in FIG. 1 and FIG. 2 indicate like elements. FIG. 4B and FIG. 4C provide an illustrative example of views of a stereo or other vision system, such as system 111 of FIG. 2, mounted on a transferring vehicle (e.g., forage harvester) and facing a receiving vehicle.

In one embodiment, the vehicle data bus 131 comprises a primary data bus 60, a secondary data bus 58, and a gateway 29. Further, optional vehicle controllers (50, 54) are coupled to the primary data bus 60 for the lights 52 and spout 189. The vehicle controller 50 controls the lights 52; the optional vehicle controller 54 can control the spout control system 116 for moving or adjusting the orientation or angle of the spout 189, or its spout end 187. The spout control system 116 may comprise an actuator for moving or adjusting the spout 189 and one or more sensors for measuring the spout angle, orientation, or position of the spout 189 or the spout end 187. For instance, the spout control system 116 or its actuator may comprise a servo-motor, electric motor, or an electro-hydraulic mechanism for moving or adjusting the spout 189.

Where the system 111 of FIG. 2 is applied to a self-propelled forage harvester, the optional vehicle controller 54, the spout control system 116, or both may control or adjust spout 189 or spout end 187 in multiple dimensions, such as two or three dimensions. For example, the vehicle controller 54 or spout control system 116 may control one or more of the following angles: (1) rotation angle of the spout 189 or spout end 187 in a generally horizontal plane, (2) tilt angle of the spout 189 or spout end 187 in a relatively vertical plane, and (3) flap angle of any deflector at or near the spout end 187, where the rotation angle, tilt angle and flap angle are associated with different axes (e.g., mutually orthogonal axes). For a forage harvester, the spout 189 (e.g., unloading auger arm) is not usually retracted and the flow of agricultural material from the spout 189 is generally continuous during harvesting.

In one embodiment, the spout control system 116 may comprise: (1) a rotation angle sensor for sensing a spout rotation angle or other spout angles of the spout 189 with respect to one or more axes of rotation and (2) an actuator (e.g., spout actuator or adjuster) for moving the spout 189 to change the spout rotation angle or other spout angles; hence, the spout position of the spout 189 or spout end 187 with respect to the receiving vehicle 79 or its storage container 85, or the target fill zone of one or more cells 308. The actuator of the spout control system 116 may comprise one or more motors, a linear motor, an electro-hydraulic device, a ratcheting or cable-actuated mechanical device, or another device for moving the spout 189, or the spout end 187. The spout angle or spout rotation angle may comprise a simple angle, a compound angle or multi-dimensional angles that can be measured with reference to any of the following: a reference axis parallel to the direction of travel of the transferring vehicle, a generally vertical axis, a generally horizontal axis, or an axis generally orthogonal to at least one of the generally vertical axis and the generally horizontal axis.

In one configuration, the spout control system 116 (of the harvester) controls a rotation angle of the spout 189 in a generally horizontal plane or about a generally vertical axis. In another configuration, the spout control system 116 or spout controller may control one or more of the following angles: (1) rotation angle of the spout 189 or spout end 187 in a generally horizontal plane, (2) tilt angle of the spout 189 or spout end 187 in a relatively vertical plane, and (3) flap angle (e.g., discharge member angle) of any deflector at or near a spout end 187, where the rotation angle, tilt angle and flap angle are associated with different axes (e.g., mutually orthogonal axes).

If a container 85 of the receiving vehicle is full (or imminently approaching a first target level 310, a second target level 312 or another full state (e.g., 309)) with agricultural material (e.g., from a transferring operation), as detected by the fill level estimator 21, the fill level estimator 21 provides a data message or control message to the alignment module 24 depending upon the detected target level and current operational mode (first mode or second mode) of the filling operation of the container 85. If the fill level estimator 21 determines that the container 85, or a group of its cells 308, has reached or satisfied the first target level 310 in the first mode, fill level estimator 21 provides the data message or control message to the alignment module 21 such that the alignment module 24 can transition from the first mode to the second mode and reverse the direction of filling to achieve the second target level 312. However, if the fill level estimator 21 determines that the container has reached or satisfied the second target level 312 in the second mode, the fill level estimator 21 provides the data message or control message to the alignment module 21 such that the alignment module can stop filling the container or storage portion and optionally alert the operator of the harvesting vehicle and the receiving vehicle via their respective user interfaces (e.g., displays in the vehicle cabs or cockpits).

In an alternate embodiment, the fill level estimator 21 is supplemented or augmented by one or more sensors (e.g., mass or optical sensors) on the receiving vehicle 79 for detecting a mass, weight or volume of agricultural material in the container 85; the imaging system 18 of the transferring vehicle 91 or the sensors of the receiving vehicle via the wireless communications devices (48, 148) may notify the operator (of the transferring vehicle 91) on the user interface 44 of the full state, fill state or full condition of the container 85.

In one configuration, the primary data bus 60 may comprise a controller area network (CAN) data bus. Similarly, the secondary data bus 58 may comprise a Controller Area Network (CAN) implement data bus. In an alternate embodiment, the primary data bus 60, the secondary data bus 58, or both may comprise an ISO (International Organization for Standardization) data bus or ISOBUS, Ethernet or another data protocol or communications standard.

In one embodiment, the gateway 29 supports secure or controlled communications between the primary data bus 60 and the secondary data bus 58, and vice versa. The gateway 29 comprises a firewall or another security device that may restrict or prevent a network element or device on the secondary data bus 58 from communicating (e.g., unauthorized communication) with the primary data bus 60 or a network element or device on the vehicle data bus 31, unless the network element or device on the secondary data bus 58 follows a certain security protocol, handshake, password and key, or another security measure. Further, in one embodiment, the gateway 29 may encrypt communications to the primary data bus 60 and decrypt communications from the primary data bus 60 if a proper encryption key is entered, or if other security measures are satisfied. The gateway may allow network devices on the secondary data bus 58 that communicate via an open standard or third party hardware and software suppliers, whereas the network devices on the primary data bus 60 are solely provided by the manufacturer.

In FIG. 2, a first location determining receiver 42, a user interface 44, a user interface processing module 26, and the gateway 29 are coupled to the vehicle data bus 131 or the secondary data bus 58. Vehicle controllers (50, 54) are coupled to the vehicle data bus 131 or the primary data bus 60. In turn, the optional vehicle controller 50 is coupled, directly or indirectly, to lights 52 on the transferring vehicle. The vehicle controller 54 is optional, as indicated by the dashed lines. The control system 116 is coupled directly to the primary data bus 60 or the vehicle data bus 131, or coupled to the primary data bus 60 or the vehicle data bus 131 via the vehicle controller 54. Although the system of FIG. 2 is well suited for use or installation on a self-propelled forage harvester, the system of FIG. 2 may also be applied to combines, harvesters or other heavy equipment.

In alternate embodiments, the system 111 of FIG. 2 may add a second imaging device 12, which is coupled to the image processing module 18 and mounted on the spout or the body of the harvester (with or without a mounting mast), to provide additional image data in a complementary field of view to provide a comprehensive view (e.g., front-to-back view or entire surface area of the cells and agricultural material within the container perimeter 81) of storage portions or containers (e.g., long or large containers) that might otherwise fall outside the field of view of the first imaging device 10.

Figure 3:
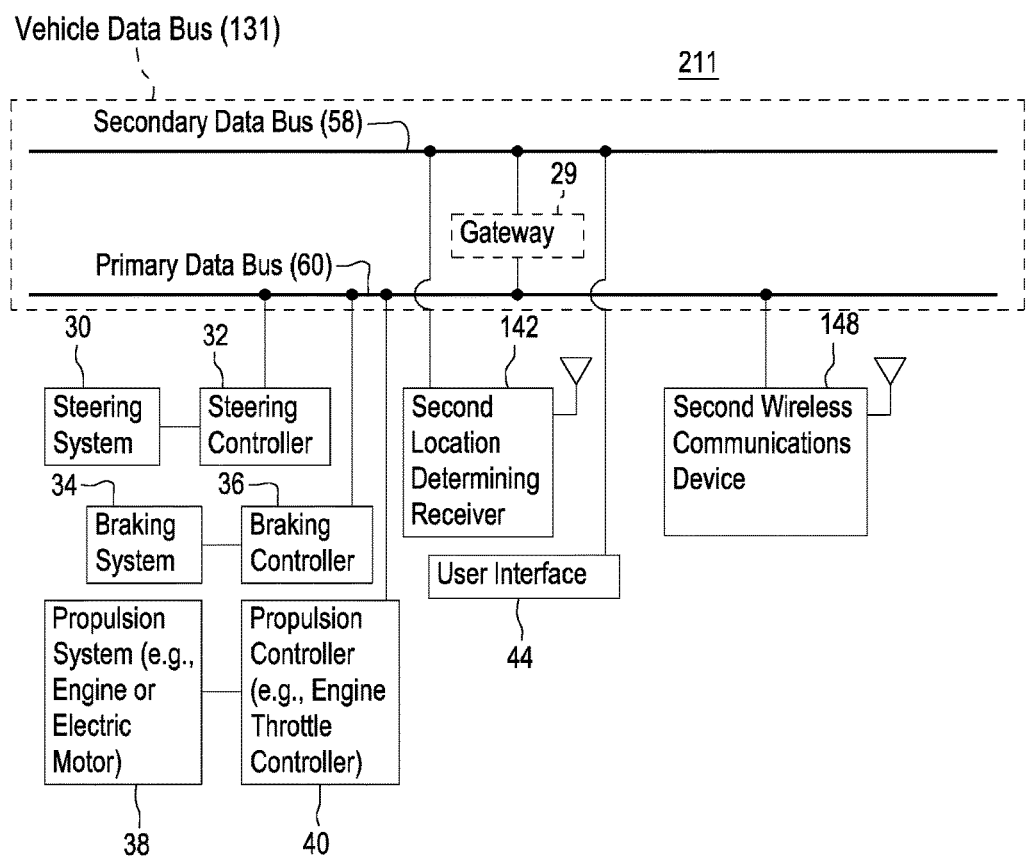
FIG. 3 is a block diagram of an embodiment of a system for a receiving vehicle (without stereo vision) for managing the unloading of agricultural material from a vehicle.

The system 11 of FIG. 1 and the system 111 of FIG. 2 apply to the transferring vehicle, whereas the system of FIG. 3 applies to the receiving vehicle (e.g., 79 in FIG. 4A or FIG. 4B). Like reference numbers in FIG. 1 through FIG. 3, inclusive, indicate like elements. As previously noted, the transferring vehicle (e.g., 91 or 191) comprises a combine, harvester, self-propelled harvester, vehicle or heavy equipment that collects or harvests material for transfer to the receiving vehicle. In one embodiment, the receiving vehicle comprises a propelled portion (e.g., 75 in FIG. 4A or FIG. 4B) and a storage portion (e.g., 93 in FIG. 4A) for storing the material transferred from the transferring vehicle. The receiving vehicle may comprise the combination of a tractor and a grain cart or wagon, where the tractor is an illustrative example of the propelled portion 75 and where the grain cart is an illustrative example of the storage portion 93.

The system 211 of vehicle electronics of FIG. 3 is similar to the system of FIG. 2, except the system of FIG. 3 deletes the first imaging device 10, the second imaging device 12, the image processing module 18, the user interface processing module 26, the vehicle controllers (50, 54), the lights 52, and spout control system 116 from FIG. 2. The system 211 of FIG. 3 comprises a second wireless communications device 148 for communicating with the first communications device 48 of FIG. 1 or FIG. 2, for example. The wireless devices (48, 148) may exchange or communicate position date, relative position data, fill state data at a cellular level or aggregate fill state level, command data, or control data for controlling, adjusting or coordinating the position and orientation of the vehicles; more particularly, the position and the orientation of the spout 89 or spout end 87 over the opening 83 of the container 85. The second wireless communications device 148 is coupled to the vehicle data bus 131. In FIG. 3, the system 211 for a receiving vehicle (without stereo vision) can be used in conjunction with the system (11 or 111) of the transferring vehicle of FIG. 1 or FIG. 2.

FIG. 4A illustrates a plan view of a transferring vehicle 91 and a receiving vehicle 79. FIG. 4A may be referred to as vehicle management system 311. As illustrated in FIG. 4A for explanatory purposes, the transferring vehicle 91 is shown as a combine with a harvesting head 185, whereas the receiving vehicle 79 is show as a tractor and a grain cart. The receiving vehicle 79 comprises the combination of a propulsion unit 75 and a storage portion 93 (e.g., a towed storage unit). The transferring vehicle 91 and the receiving vehicle 79 generally move in the direction of travel 186 in a state of alignment or coordination to achieve the transfer of agricultural material from the transferring material 91 to the receiving vehicle 79, although the heading and speed of the vehicles (79, 91) may differ from time to time to adjust the relative position of the vehicles (79, 91) or the relative position of the spout 89 with respect to the storage portion 93 or container 85.

In FIG. 4A, the first imaging device 10 has a first field of view 77 and the optional second imaging device 12 has a second field of view 177, where both fields of view (77, 177) can observe (e.g., from a higher elevation or height than the top of the container 85) the interior of the container 85 or the agricultural material within the container 85. The agricultural material in the container 85 occupies one or more cells 308 or cellular columns with a height that is measured by the image processing module 18 or the fill level estimator 21. Each cell 308 can have a substantially equal total volume (e.g., or certain equal dimensions, such as equal cell length and cell width that are equal to or different than the cell height) to the other cells 308 and the volume of the container 85 can be subdivided into virtually any number of cells that is capable of being tracked within the resolution of one or more imaging devices (10, 12) and imaging processing module 18.

FIG. 4B illustrates a plan view of a transferring vehicle 191 and a receiving vehicle 79. FIG. 4B may be referred to as vehicle management system 411. As illustrated in FIG. 4B for explanatory purposes, the transferring vehicle 191 is shown as a harvester, such as a self-propelled forage harvester with a forage harvesting head 285, whereas the receiving vehicle 79 is show as a tractor and a grain cart. Like reference numbers in FIG. 4A, FIG. 4B and FIG. 4C indicate like elements or features.

In one embodiment, the combine of FIG. 4A uses a first imaging device 10 on the spout 89 and a second imaging device 12 on the transferring vehicle 91, whereas the transferring vehicle 191 of FIG. 4B uses the first imaging device 10 on the spout 189. In FIG. 4B, the first imaging device 10 has a first field of view 77 that looks downward into the interior of the container to facilitate evaluation or estimation of the level or height of agricultural material loaded in the container 85, or the level of agricultural material associated with corresponding cells 308 of the container 85.

FIG. 4C shows a back view of the transferring vehicle 191 and the receiving vehicle 79 as viewed along reference line 4C-4C of FIG. 4B. FIG. 4C provides an illustrative embodiment of the spout control system 116. For example, in FIG. 4C, the spout control system 116 comprises a first spout actuator 300 that facilitates rotation of the spout 189 about a vertical axis 412 to provide adjustment of the spout 189 or the spout end 187 in a generally horizontal plane; the spout control system 116 comprises a second spout actuator 302 to adjust the tilt angle of the spout 189 or spout end 187 in a relatively vertical plane; the spout control system 116 comprises a third spout actuator 304 for adjusting a flap angle of a flap member or deflector 306 at an end of the spout 189. The rotation angle, tilt angle and flap angle can be associated with different rotational axes (e.g., mutually orthogonal axes).

As previously indicated, the agricultural material in the container 85 occupies one or more cells 308 or cellular columns with a height that is measured by the image processing module 18 or the fill level estimator 21. FIG. 4C illustrates the first target level 310 and the second target level 312. In one embodiment, the first target level 310 is a height of agricultural material (e.g., in the cells or a group of cells) that is near or below the top or top container edge 181 (i.e., at approximately 100% level) of the container 85 and wherein the second target level is equal to or greater than the top or top container edge 181 of the container 85.

In FIG. 4 A through FIG. 4C, inclusive, the spout (89, 189) may also be referred to as the unloading auger. The spout end (87, 187) may be referred to as boot, which can be a hard rubber piece at the tip of the spout to direct the unloaded material (e.g., downward). In FIG. 4A through FIG. 4C, inclusive, the spout (89, 189), or the spout end (87, 187), is generally aligned above or over a target fill zone, or selected set of one or more target cells 308 of the storage container 85 (of the receiving vehicle) in accordance with a fill sequence or plan for unloading material from the transferring vehicle to the receiving vehicle. Similarly, the transferring vehicle and the receiving vehicle are aligned in position as shown, regardless of whether the vehicles move together in a forward motion (e.g., with coordinated or tracked vehicle headings) during harvesting, as is typical, or are stationary.

Figure 5:
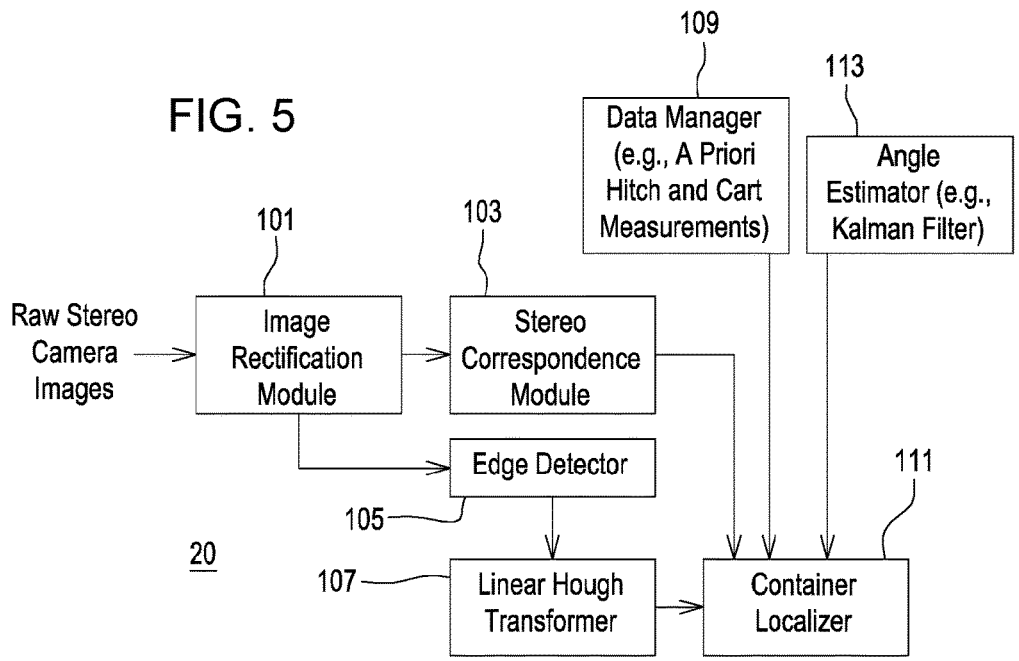
FIG. 5 is an illustrative block diagram of a method or process for processing image data (e.g., raw stereo camera images) to identify the boundary or edges of the container of the receiving vehicle in the image data.
Figure 6:
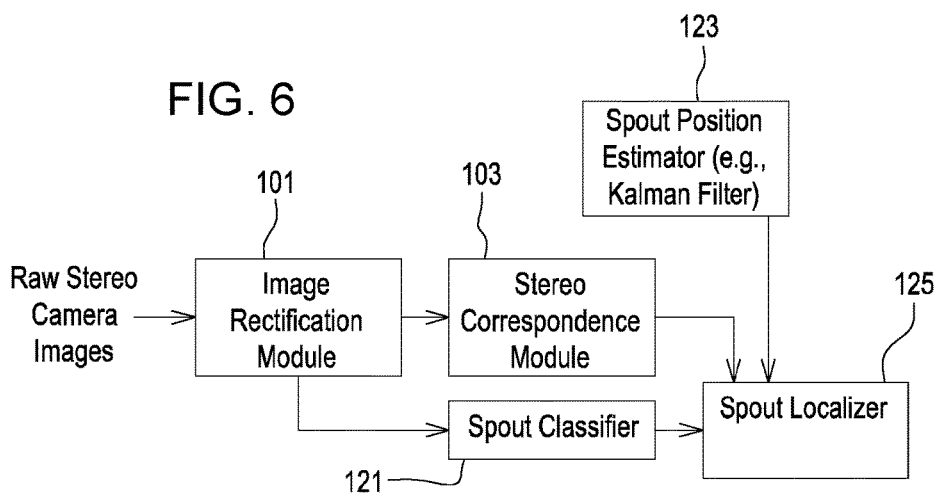
FIG. 6 is an illustrative block diagram of a method or process for processing image data to identify a spout or spout end in the image data for estimating a position of the spout end with respect to the receiving vehicle or container.

In FIG. 5 and FIG. 6, similar to FIG. 1 through FIG. 3, inclusive, each of the blocks or modules may represent software modules, electronic modules, or both. Software modules may contain software instructions, subroutines, object-oriented code, or other software content. The arrows that interconnect the blocks or modules show the flow of data or information between the blocks. The arrows may represent physical communication paths or virtual communication paths, or both. Physical communication paths mean transmission lines or one or more data buses for transmitting, receiving or communicating data. Virtual communication paths mean communication of data, software or data messages between modules.

FIG. 5 is an illustrative block diagram of a method or process for processing image data (e.g., raw stereo camera images) to identify the boundary or edges of the container of the receiving vehicle in the image data. FIG. 5 is a block diagram that shows the imaging processing module 18 and the container identification module 20 in greater detail than FIG. 1. Like reference numbers in FIG. 1, FIG. 5, and FIG. 6 indicate like elements. As illustrated in FIG. 5, the first imaging device 10, the second imaging device 12, or both, provide input of raw stereo camera images (or raw image data) to the image rectification module 101. In turn, the image rectification module 101 communicates with the stereo correspondence module 103 and the edge detector 105. The edge detector 105 provides an output to the linear Hough transformer 107. The outputs of the stereo correspondence module 103 and the linear Hough transformer 107 are provided to the container localizer 111. The container localizer 111 may access or receive stored (a priori) hitch and cart measurements from the data manager 109. In one embodiment, the container localizer 111 may receive or access and an estimate of the tongue angle (97 in FIG. 4A) of the angle estimator 113 (e.g., Kalman filter) and stored hitch and cart measurements.

In the one embodiment, the image rectification module 101 provides image processing to the collected image data or raw stereo images to reduce or remove radial lens distortion and image alignment required for stereo correspondence. The radial lens distortion is associated with the radial lenses of the first imaging device 10, the second imaging device 12, or both. The input of the image rectification module 101 is raw stereo image data, whereas the output of the image rectification module 101 is rectified stereo image data.

In one illustrative embodiment, the image rectification module 101 eliminates or reduces any vertical offset or differential between a pair of stereo images of the same scene of the image data. Further, the image rectification module can align the horizontal component (or horizontal lines of pixels of the stereo images) to be parallel to the scan lines or common reference axis of each imaging device (e.g., left and right imaging device) within the first and second imaging devices (10, 12). For example, the image rectification module may use image processing (e.g., statistical image processing) and calibration information for the image processing devices (10, 12) to achieve rectified right and left images of the stereo image. The rectified image supports efficient processing and ready identification of corresponding pixels or objects within the image in the left image and right image of a common scene for subsequent image processing (e.g., by the stereo corresponding module 103). As used herein, the right image may refer to a first image, a right image or an upper image, whereas the left image may refer to a second image, a left image, or a lower image. As used herein, the right image may refer to a first image, a right image or an upper image, whereas the left image may refer to a second image, a left image, or a lower image.

In one configuration, the stereo correspondence module 103 applies a stereo matching algorithm or disparity calculator to collected stereo image data, such as the rectified stereo image data outputted by the image rectification module 101. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto, or along a vertical axis of the images or parallel thereto, or along another reference axis).

In an illustrative sum of the absolute differences procedure, the right and left images, blocks or rows in image data can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

The image processing module 18 estimate a distance or range from the first imaging device 10, the second imaging device 12, or both to the pixels or points lying on the container perimeter 81, on the container edge 181, on the spout 98, on the spout end (87, 187), or on any other linear edge, curve, ellipse, circle or object identified by the edge detector 105, the linear Hough transformer 107, or both. For example, the image processing module 18 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

In one embodiment, the container identification module 20 comprises: (1) an edge detector 105 for measuring the strength or reliability of one or more edges 181, or points on the container perimeter 81 in the image data; (2) a linear Hough transformer 107 for identifying an angle and offset of candidate linear segments in the image data with respect to a reference point on an optical axis, reference axis of the one or more imaging devices (10, 12); (3) a container localizer 111 adapted to use spatial and angular constraints to eliminate candidate linear segments that cannot logically or possibly form part of the identified linear segments of the container perimeter 81, or points on the container perimeter 81; and (4) the container localizer 111 transforms the non-eliminated, identified linear segments, or identified points, into two or three dimensional coordinates relative to a reference point or reference frame of the receiving vehicle and harvesting vehicle.

The edge detector 105 may apply an edge detection algorithm to rectified image data from the image rectification module 101. Any number of suitable edge detection algorithms can be used by the edge detector 105. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector 105 may provide a numerical output, signal output, or symbol, indicative of the strength or reliability of the edges 181 in field. For example, the edge detector may provide a numerical value or edge strength indicator within a range or scale or relative strength or reliability to the linear Hough transformer 107.

The linear Hough transformer 107 receives edge data (e.g., an edge strength indicator) related to the receiving vehicle and identifies the estimated angle and offset of the strong line segments (e.g., of the container 85, the spout (89, 189), the spout end (87, 187) and opening 83) in the image data. The estimated angle is associated with the angle or compound angle (e.g., multidimensional angle) from a linear axis that intercepts the lenses of the first imaging device 10, the second image device 12, or both. The linear Hough transformer 107 comprises a feature extractor for identifying line segments of objects with certain shapes from the image data. For example, the linear Hough transformer 107 identifies line equation parameters or ellipse equation parameters of objects in the image data from the edge data outputted by the edge detector, or Hough transformer 107 classifies the edge data as a line segment, an ellipse, or a circle. Thus, it is possible to detect containers or spouts with generally linear, rectangular, elliptical or circular features.

In one embodiment, the data manager 109 supports entry or selection of container reference data by the user interface 44. The data manager 109 supports entry, retrieval, and storage of container reference data, such as measurements of cart dimensions, by the image processing module 18 to give spatial constraints to the container localizer 111 on the line segments or data points that are potential edges 181 of the cart opening 83.

In one embodiment, the angle estimator 113 may comprise a Kalman filter or an extended Kalman filter. The estimator 113 estimates the angle (e.g., 97 in FIG. 4A) of the storage portion 93 (e.g., cart) of the receiving vehicle 79 to the propelled portion 75 (e.g., tractor) of the receiving vehicle 79. The angle estimator 113 (e.g., Kalman filter) provides angular constraints to the container localizer 111 on the lines, or data points, that are potential edges 181 of the container opening 83. In configuration, the angle estimator 113 or Kalman filter is coupled to the localizer 111 (e.g., container localizer). The angle estimator filter 113 outputs, or is capable of providing, the received estimated angle of the storage portion 93 relative to the propelling portion 75 of the vehicle.

The localizer 111 is adapted to receive measurements of dimensions of the container perimeter 81 or the storage portion 93 of the vehicle to facilitate identification of candidate linear segments that qualify as identified linear segments of the container perimeter 81. In one embodiment, the localizer 111 is adapted to receive an estimated angle of the storage portion 93 relative to the propelling portion 75 of the vehicle to facilitate identification of candidate linear segments that qualify as identified linear segments of the container perimeter 81. The localizer 111 uses spatial and angular constraints to eliminate candidate lines in the image data that cannot be possibly or logically part of the container opening 83 or container edges 181, then selects preferential lines (or data points on the container edge 81) as the most likely candidates for valid container opening 83 or container edges 181. The localizer 111 characterizes the preferential lines as, or transformed them into, three dimensional coordinates relative to the vehicle or another frame of reference to represent a container perimeter of the container 85.

FIG. 6 is an illustrative block diagram of a method or process for processing image data to identify a spout or spout end in the image data for estimating a position of the spout end with respect to the receiving vehicle or container. FIG. 6 is a block diagram that shows the imaging processing module and the spout identification module 22 in greater detail than FIG. 1. Like reference numbers in FIG. 1, FIG. 5 and FIG. 6 indicate like elements. In FIG. 6, the image rectification module 101 communicates with the stereo correspondence module 103 and the spout classifier 121. In turn, the spout classifier 121 provides an output to the spout localizer 125. The spout localizer 125 accesses or receives the spout position from the spout position estimator 123 (or spout angle 98 with respect to the transferring vehicle direction of travel or vehicle reference frame), stereo correspondence data from the stereo correspondence module 103, and the output data from the spout classifier 121.

In one embodiment, the spout identification module 22 comprises a spout classifier 121 that is configured to identify candidate pixels in the image data based at least one of reflectivity, intensity, color or texture features of the image data (or pixels), of the rectified image data or raw image data, where the candidate pixels represent a portion of the spout (89, 189) or spout end (87, 187). The spout localizer 125 is adapted to estimate a relative position of the spout (89, 189) or spout end (87, 187) with respect to the imaging device (10, 12) based on the classified, identified candidate pixels of a portion of the spout (89, 189). The spout localizer 125 receives an estimated combine spout position or spout angle 98 relative to the mounting location of the imaging device, or optical axis, or reference axis of one or more imaging devices, based on previous measurements to provide constraint data on where the spout (89, 189) can be located possibly.

The spout classifier 121 applies or includes software instructions on an algorithm that identifies candidate pixels that are likely part of the spout (89, 189) or spout end (87, 187) based on expected color and texture features within the processed or raw image data. For example, in one configuration the spout end (87, 187) may be painted, coated, labeled or marked with a coating or pattern of greater optical or infra-red reflectivity, intensity, or luminance than a remaining portion of the spout (89, 189) or the transferring vehicle. The greater luminance, intensity or reflectivity of the spout end (87, 187) (or associated spout pixels of the image data versus background pixels) may be attained by painting or coating the spout end (87, 187) with white, yellow, chrome or a lighter hue or shade with respect to the remainder of the spout (89, 189) or portions of the transferring vehicle (within the field of view of the imaging devices (10, 12).

In one embodiment, the spout position estimator 123 comprises a Kalman filter or an extended Kalman filter that receives input of previous measurements and container reference data and outputs an estimate of the spout position, spout angle, or its associated error. The spout position estimator 123 provides an estimate of the combine spout position, or spout angle, or its error, relative to one or more of the following: (1) the mounting location or pivot point of the spout on the transferring vehicle, or (2) the optical axis or other reference axis or point of the first imaging device 10, the second imaging device 12, or both, or (3) the axis associated with the forward direction of travel or the heading of the transferring vehicle. The Kalman filter outputs constraints on where the spout (89, 189) or spout end (87, 187) can be located, an estimated spout position, or a spout location zone or estimated spout position zone. In one embodiment, the spout position estimator 123 or Kalman filter is coupled to the spout localizer 125.

The spout localizer 125 takes pixels that are classified as belonging to the combine auger spout and uses a disparity image (from stereo correspondence data) to estimate the relative location of the spout to the first imaging device 10, the second imaging device 12, or both.

Figure 7:
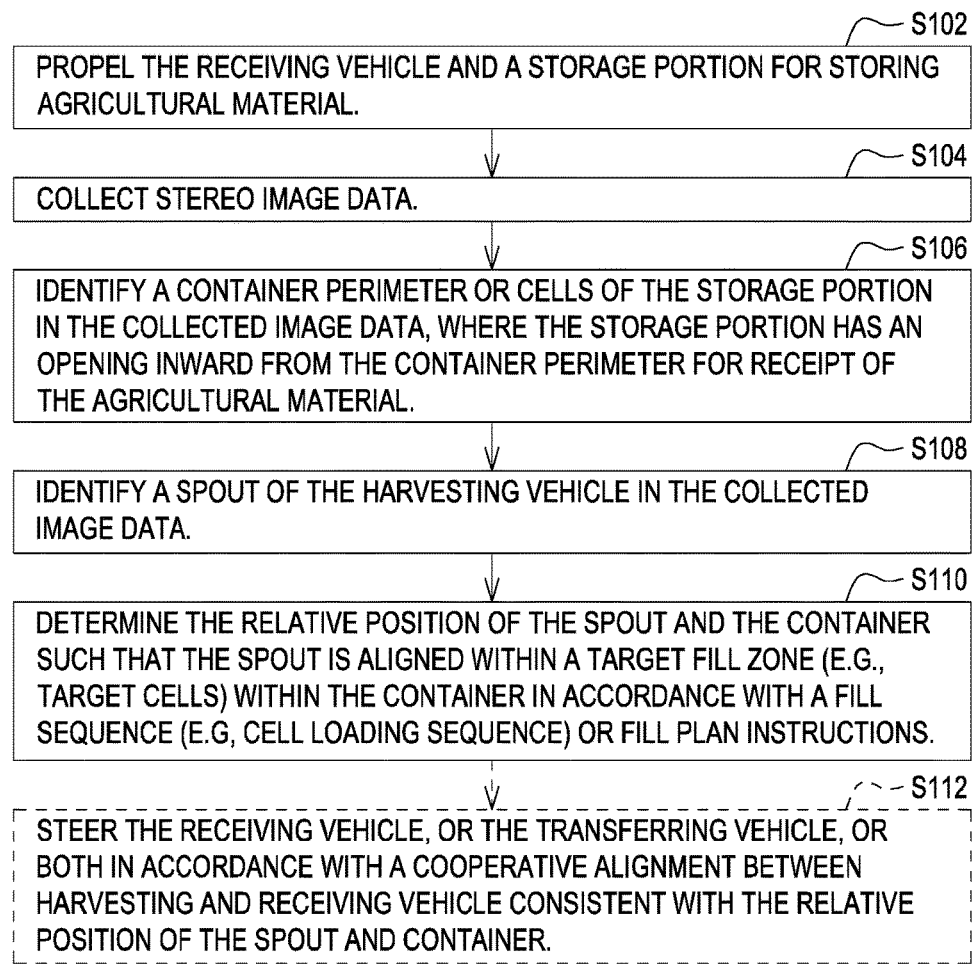
FIG. 7 is a flow chart of one method for a stereo vision system for managing the unloading of agricultural material from a vehicle (e.g., combine).

FIG. 7 is a flow chart of a method for managing the unloading of agricultural material from a vehicle or between a transferring vehicle (e.g., 91 or 191) and a receiving vehicle (e.g., 79). The method of FIG. 7 begins in step S102 and may use one or more of the following embodiments of the systems (11, 111, 211, 311 or 411) previously disclosed herein.

In step S102, the receiving vehicle 79 propels the storage portion 93 or container 85 for storing agricultural material. For example, the receiving vehicle 79 propels and directs the storage portion 93 or container 85 to track the velocity and heading of the transferring vehicle (91, 191), or to track the velocity, acceleration and heading of the transferring vehicle (91, 191) to maintain a target spatial separation or cooperative alignment between the two vehicles (79 and 91 or 191) for unloading or transferring the agricultural material from the transferring vehicle to the storage portion 93 or container 85.

In step S104, a first imaging device 10, a second imaging device 12, or both collect stereo image data or image data. For example, the first imaging device 10 may be mounted on the transferring vehicle 91 facing the receiving vehicle 79 or facing downward into the container 85 for collection of the image data. Similarly, the first imaging device 10 may be mounted on the transferring vehicle 191 or its spout 189 for facing downward to provide a field of view that includes the container perimeter 81 or a group of cells 308 (e.g., all of the cells 308) in the container 85.

In step S106, an image processing module 18 or a container identification module 20 identifies a container perimeter 81 or cells 308 of the storage portion 93 in the collected image data, where the storage portion 93 has an opening 83 inward from the container perimeter 81 for receipt of the agricultural material. Step S106 may be carried out in accordance with various techniques, which may be applied alternately or cumulatively. Under a first step, the image processing module 18 or container identification module 20 may employ the following processes or sub-steps: (1) measuring a strength of one or more edges 181 in the image data (raw and rectified image data); (2) identifying an angle and offset of candidate linear segments in the image data with respect to an optical axis, reference axis (e.g., direction of travel of the transferring vehicle), or reference point indexed to one or more imaging devices (10, 12); and (3) using spatial and angular constraints to eliminate identified candidate linear segments that cannot logically or possibly form part of the identified linear segments of the container perimeter, where the localizer 111 transforms the identified linear segments into three dimensional coordinates relative to a reference point or reference frame of the receiving vehicle and/or the harvesting vehicle.

Under a second technique, the image processing module 18 or container identification module 20 may receive container reference data, or measurements of dimensions of the container perimeter 81 or the storage portion 93 of the vehicle, to facilitate identification of candidate linear segments, or candidate data points, that qualify as identified linear segments of the container perimeter 81.

Under the third technique, the image processing module 18 or container may receive an estimated angle 97 of the storage portion 93 relative to the propelling portion 75 of the vehicle to facilitate identification of candidate linear segments that qualify as identified linear segments of the container perimeter 81.

Under a fourth technique, the image processing module 18 or container 85 provides the received estimated angle 97 of the storage portion 93 relative to the propelling portion 75 of the vehicle.

In step S108, the image processing module 18 or a spout identification module 22 identifies a spout (89, 189), or spout end (87, 187), of the transferring vehicle (e.g., harvesting vehicle) in the collected image data. The image processing module 18 or the spout identification module 22 may use various techniques, which may be applied alternately or cumulatively. Under a first technique, the image processing module 18 or the spout identification module 22 identifies candidate pixels in the image data (e.g., rectified or raw image data) based on expected color and expected texture features of the image data, where the candidate pixels represent a portion of the spout 89 (e.g., combine auger spout) or spout end 87.

Under a second technique, the image processing module 18 or the spout identification module 22 estimates a relative position, or relative angle, of the spout 89 or the spout end 87, to the imaging device based on the classified, identified candidate pixels of a portion of the spout 89.

Under a third technique, the image processing module 18 or the spout identification module 22 receives an estimated combine spout position, or spout angle from the spout control system (16, 116) or its sensors, relative to the mounting location, optical axis, reference axis, or reference point of the imaging device (10, 12) based on previous measurements to provide constraint data on where the spout 56 can be located possibly.

Under a third technique, the image processing module 18 provides the estimated combine spout position, or estimated spout angle, to the spout localizer 125.

In step S110, the image processing module 18 or the alignment module 24 determines the relative position of the spout (89, 189) or the spout end (87, 187), and the container 85 (e.g., container perimeter 81) such that the spout is aligned within the a target fill zone (e.g., one or more target cells 308) within the container 85 in accordance with a fill sequence (e.g., cell loading sequence) or fill plan instructions. Step S110 may be accomplished in accordance with various techniques, which may be applied separate or cumulatively.

Under a first technique, an alignment module 24 is adapted to determine the relative position of the spout (89, 189), or spout end (87, 187) and the target cells of a target fill zone in the container 85 via processing of the image data such that the spout (89, 189), or spout end (87, 187) is aligned within a target fill zone of the cells in accordance with a fill sequence or fill plan instructions in which (a) first, the alignment module 24 is adapted to direct the spout (89, 189) to fill the container 85 with the material in a first mode to a first target level 310 that is less than a peak height of the container; (b) second, the fill level estimator 21 is adapted to estimate the number of cells 308 that are below the first target level after directing the spout (89, 189) to fill in the first mode; and (c) third, the alignment module 24 is adapted to direct the spout (89, 189) to fill the container in a second mode to a second target level that is greater than the first target level if less than (or no more than) the threshold number (e.g., first threshold or critical number) of cells are below the first target level, where the second mode is generally opposite in direction of the relative spout-container movement of the first mode.

Under a second technique, the alignment module 24 directs the relative position of the spout (89, 189) or spout end (87, 187) to the target fill zone within the container by control of or communication with one or more of the following: (1) the spout control system (16, 116) controlling one or more actuators (e.g., 300, 302, 304), (2) one or more controllers (32, 36, 40) of the transferring vehicle (91, 191) to adjust the relative heading, or relative position between the transferring vehicle 91 and receiving vehicle 79, or (3) one or more controllers of the receiving vehicle 79 to adjust the relative heading or relative position between the transferring vehicle 91 and the receiving vehicle 79.

Under a third technique, the alignment module 24 directs the filling of the container in accordance with the steps or procedures set forth in FIG. 8, which is described below.

Step S112 is optional as indicated by the dashed lines. In step S112, the steering system 30 or steering controller 32 steers the receiving vehicle 79, the transferring vehicle 91, or both in cooperative alignment between the transferring vehicle 91 (e.g., harvesting vehicle) and the receiving vehicle 79 consistent with the relative position of the spout (89, 189) and the container 85.

Step S112 may be executed in accordance with various configurations, which may be applied separately or cumulatively. In step S112, in a first configuration, the vehicle controller 46 or the steering controller 32 steers the receiving vehicle in accordance with the cooperative alignment that is consistent with the fill sequence or cell loading sequence. In a second configuration, the vehicle controller or the steering controller 32 may steer the transferring vehicle in accordance with the cooperative alignment. In a third configuration, the vehicle controller 46 or steering controllers 32 of both the transferring vehicle and the receiving vehicle steer both vehicles in accordance with the cooperative alignment.

In a fourth configuration, the system (11, 111, 211, 311) can periodically, regularly or continuously monitor the cooperative alignment (e.g., relative position) between the spout end (87, 187) and the container perimeter 81 (target fill zone of the container 85). Further, the system can send commands to the receiving vehicle via wireless communication devices (48, 148) and via the vehicle data bus (e.g., primary data bus 60 or a CAN bus (ISO Class 3 interface)) to adjust the speed, velocity, or acceleration of the receiving vehicle via the propulsion controller 40 in order to maintain a constant relative position or cooperative alignment.

Figure 8:
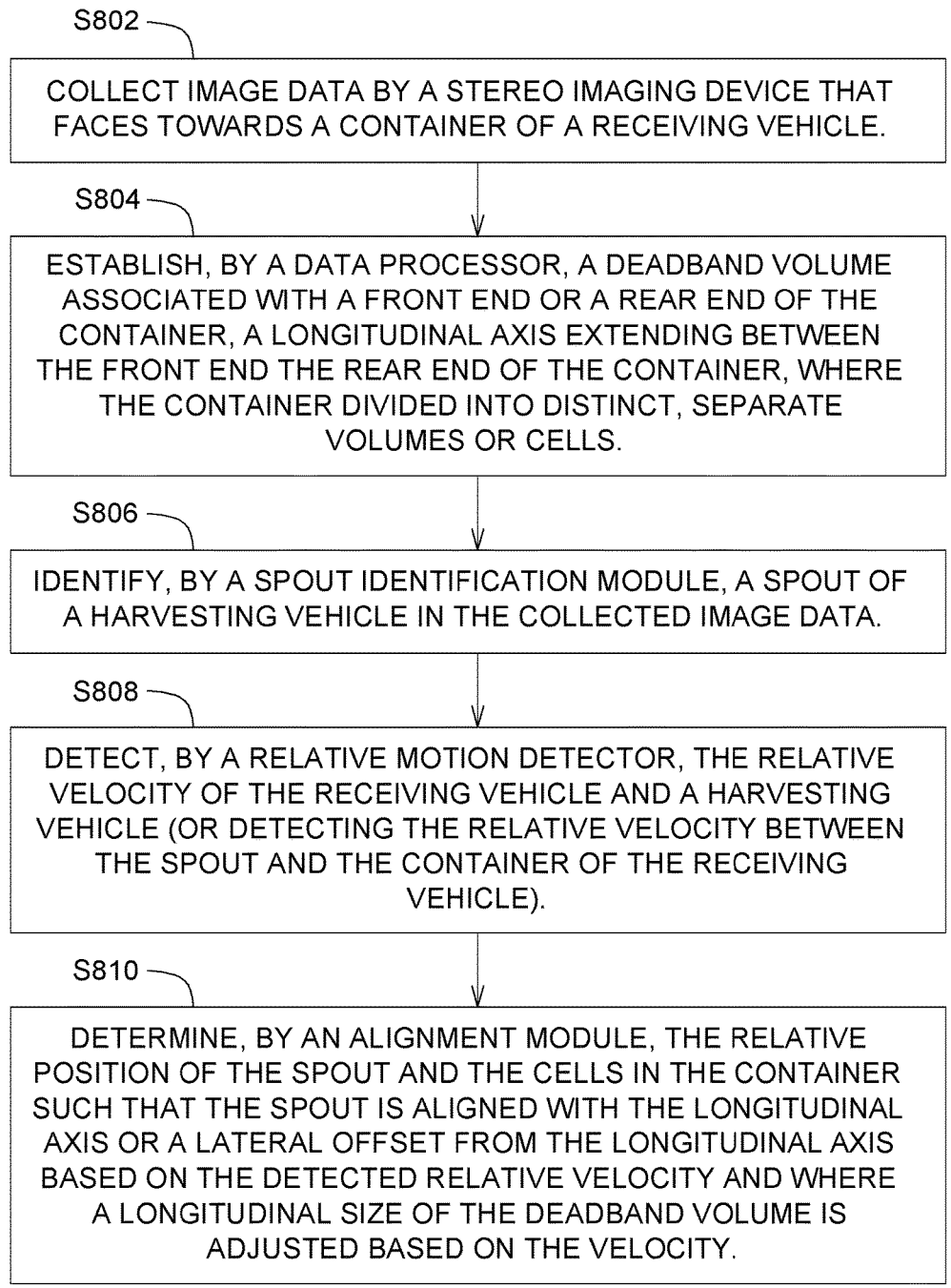
FIG. 8 is a flow chart of a method that provides an illustrative example determining the relative position of the spout and the container and filling the container with material in accordance with FIG. 7.

FIG. 8 illustrates a method for facilitating the transfer of agricultural material from a transferring vehicle (91 or 191) to a receiving vehicle 79. For example, the method of FIG. 8 provides an illustrative example of executing step S110 of FIG. 7. Like reference numbers indicate like steps or procedures in FIG. 7 and FIG. 8.

In step S802, a first imaging device 10 (e.g., stereo imaging device) collects image data, where the first imaging device 10 faces towards a container 85 of a receiving vehicle 79. In an alternate embodiment, the first imaging device 10, the second imaging device 12, or both collect image data, where the imaging devices (10,12) face toward the container 85 of the receiving vehicle 79.

In step S804, an image processing module 18 or its data processor 94 establishes a deadband volume (311, 313, or both) associated with a front end 316, a rear end 318, or both of the container 85. Further, a longitudinal axis (504, 506, or 507) extends between the front end 316 the rear end 318 of the container 85, where the container 85 divided into distinct, separate volumes or cells 308. In practice in step S804, the image processing module 18 or the data processor 94 first identifies a container perimeter 81 in the collected image data, where the deadband volume (311, 313, or both), the longitudinal axis (504, 506 or 507) are determined, secondly, relative to or with respect to the container perimeter 81. As illustrated, the longitudinal axis 504 bisects the container 85 or container perimeter 81 into two substantially equal volumes or an approximately equal number of cells 308 laterally on each side of the longitudinal axis 504. However, as will be described later in this disclosure, the longitudinal axis may be offset laterally to compensate for a lateral slope in the ground, wind or uneven filling of the container 85.

In step S806, a spout identification module 22, the image processing module 18, or its data processor 94 identifies a spout (89, 189) or spout end (87, 187) of a transferring vehicle (91 or 191), such as a forage harvester, in the collected image data. In an alternate embodiment, the spout identification module 22, the image processing module 18, or its data processor 94 identifies the spout (89, 189) or spout end (87, 187) in the collected image data based on one more of the following: (1) image processing (as described in FIG. 5 or FIG. 6), (2) color differentiation of pixels on the spout (89, 189) or spout end (87, 187) from background pixels, (3) linear edge detection of the spout (89, 189) or spout end (87, 187) from background pixels, or (4) angle or position sensors of one or more sensors associated with the spout (89, 189), the spout end (87, 187), or the spout control system 116, where such sensors may comprise magnetic field sensors (with one or more associated magnets secured to the spout (89, 189) or spout end (87, 187)) or resistive sensors that detect a position or angular position, a compound angle, or a multi-dimensional angles of a spout (89, 189) or spout end (87, 187) with respect to the transferring vehicle.

In step S808, a relative motion module 96 (e.g., relative velocity detector) detects one or more of the following: (1) the relative motion or relative velocity of the receiving vehicle 79 and the transferring vehicle (91 or 191) during a sampling interval or time period; (2) the relative motion or relative velocity between the spout (89 or 189) (e.g., or spout end, 87 or 187) and the container 85 of the receiving vehicle 79 during a sampling interval or time period; (3) the relative position of the receiving vehicle 79 and the transferring vehicle (91 or 191) during a sampling interval or versus time (e.g., where relative position is based on one or more reference points associated with a cloud or constellation of points (pixels in image data with three dimensional coordinates) that define the transferring vehicle and the receiving vehicle); (4) the relative position between the spout (e.g., or spout end, 87 or 187) and the container 85 of the receiving vehicle 79 during the sampling interval versus time; (5) the relative acceleration of the receiving vehicle 79 and the transferring vehicle (91 or 191) during the sampling interval or time period; (6) the relative acceleration between the spout (89 or 189) (e.g., or spout end, 87 or 187) and a container 85 of the receiving vehicle 79 during a sampling interval or time period.

For example, the relative motion module 96 (e.g., velocity detector), the data processor 94, or the a vehicle controller (e.g., 32, 36, 40, 46, 54): (1) receives first velocity data from first location determining receiver 42 on the transferring vehicle (91 or 191) and second velocity data from a second location determining receiver 142 on the receiving vehicle and (2) determines a difference between the first velocity data and the second velocity data for a sampling interval or time period to estimate relative velocity between the transferring vehicle (e.g., harvesting vehicle, 91 or 191) and the receiving vehicle 79. In practice, the first location determining receiver 42 may provide first velocity data, alone or in combination with first position data and first acceleration data of the transferring vehicle (91 or 191) for one or more sampling intervals, whereas the second location determining receiver 42 may provide second velocity data, alone or in combination with the second position data and second acceleration data of the receiving vehicle for corresponding sampling intervals (e.g., same epochs of the satellite navigation receiver).

In an alternate embodiment, the relative motion module 96, the data processor 94 or a vehicle controller (e.g., 32, 36, 40, 46, 54): (1) receives first velocity data from a first velocity sensor (e.g., ground speed radar sensor, or wheel odometer and timer) or first accelerometer, (2) determines a difference between the first velocity data and the second velocity data, or (3) determines a difference between first acceleration data and second acceleration data.

In step S810, an alignment module 24 (alone or together with the relative motion module 96) or the data processor 94 determines the relative position of the spout (89, 189) (e.g., or the spout end, 87, 187) and the cells 308 in the container 85 such that the spout or spout end is aligned with the longitudinal axis or a lateral offset from the longitudinal axis based on the detected relative velocity and where a longitudinal size of the deadband volume (311, 313, or both) is adjusted based on the velocity. For example, the data processor 94 controls the spout or spout end to compensate for slope (e.g., lateral slope or slope in one or more dimensions, such as roll, pitch and yaw angles of the container 85) of the ground beneath the receiving vehicle or container, the wind vector (e.g., wind speed and direction) and any prior uneven filling of the container (e.g., with detection of fill level of different cells 308 by fill level estimator 21).

Step S810 may be executed in accordance with various techniques, which may be applied separately or cumulatively.

Under a first technique, the alignment module 24 or the data processor 94 adjusts (or is adapted to adjust) the longitudinal size of the deadband volume (311, 313, or both) based on the relative velocity or relative motion in an X direction with respect to the X-axis 512, where the X direction or X-axis 512 is coextensive with or substantially parallel to the longitudinal axis 504, and where a Y direction or a Y-axis 510 that is substantially perpendicular to the X direction or X-axis 512, respectively. For example, the alignment module 24 or the data processor 94 adjusts (or is adapted to adjust) the longitudinal size of the deadband volume (311, 313, or both) based on the relative velocity or relative motion in an X direction in accordance with the chart or look-up table of FIG. 15 or an equivalent mathematical function. In this document, the longitudinal size can be aligned with or coextensive with the longitudinal axis 504, or with the depth of any deadband volume (311, 312, 313) with respect to front end 316 or rear end 318 of the container 85.

Under a second technique, the alignment module 24 or the data processor 94 increases (or is adapted to increase) the longitudinal size of the deadband volume (311, 313, or both) in response to an increase in the relative velocity (or relative motion) in the X direction (e.g., along the X axis 512) during a sampling interval and decreases the longitudinal size of the deadband volume (311, 313, or both) based on a decrease in the relative velocity (or relative motion) in the X direction during a sampling interval. For instance, the longitudinal size of the deadband volume may be adjusted dynamically and changed as frequently as each sampling period.

Under a third technique, the alignment module 24 or the data processor 94 adjusts (or is adapted to adjust) the lateral offset 508 based on the relative velocity (or relative motion) in the Y direction (e.g., along the Y-axis 510), where an X direction (e.g., along the X-axis 512) is coextensive with or substantially parallel to the longitudinal axis, and where a Y direction is substantially perpendicular to the X direction. For example, the alignment module 24 or the data processor 94 adjusts (or is adapted to adjust) the lateral offset 508 based on the relative velocity (or relative motion) in the Y direction (e.g., along the Y-axis 510), where an X direction (e.g., along the X-axis 512) is coextensive with or substantially parallel to the longitudinal axis, and where a Y direction is substantially perpendicular to the X direction in accordance with the chart or look-up table of FIG. 15 or an equivalent mathematical function.

Under a fourth technique, the alignment module 24 or the data processor 94 increases (or is adapted to increase) the lateral offset 508, as a first adjustment, in response to an increase in the relative velocity in the Y direction (e.g., along the Y axis 510) and decreasing the lateral offset, as a second adjustment, based on a decrease in the relative velocity (or relative motion) in the Y direction.

Under a fifth technique, the alignment module 24 or the data processor 94 increases (or is adapted to increase) the lateral offset 508 in response to an increase in the relative velocity (or relative motion) in the Y direction and increases (or is adapted to increase) the longitudinal size of the deadband volume (311, 313, or both) in response to an increase in the relative velocity (or relative motion) in the X direction.

Under a sixth technique, the alignment module 24 or the data processor 94 directs the spout (89, 189) or spout end (87, 187) along the longitudinal axis (504, 506, 507) with the lateral offset (508, 509) in accordance with a first mode that comprises relative movement of the spout end (87, 187) to the container 85 in the front-to-back direction, where front is direction of forward travel of the transferring vehicle (91 or 191). In one embodiment, the first mode comprises relative movement of the spout (89, 189) or spout end (87, 187) to the container 85 in the back-to-front direction, where the front facing forward toward the direction of forward travel of the transferring vehicle (91 or 191). If the first mode is executed with spout movement in the back-to-front direction, the initial position of the spout (89, 189) or spout end (87, 187) is aligned with the rear-most empty cell 308 (e.g., along the longitudinal axis with any lateral offset) within reach of the spout stream or flow of agricultural material, and may exclude a dead band region or dead band cells 308 at the rear end 318 of the container 85 that may not be capable of readily filling to full target height. However, if the first mode is executed with spout movement in the front-to-back direction, the initial position of the spout (89, 189) or spout end (87, 187) is aligned with the front-most empty cell 308 (e.g., along the longitudinal axis (504, 506) with any lateral offset 508) within reach of the spout stream or flow of agricultural material, and may exclude a dead band region (311, 313) or dead band cells 308 at the front end 316 of the container 85 that may not be capable of readily filling to full target height.

Under a seventh technique, the alignment module 24 or the data processor 94 directs (or is adapted to direct) the spout end (87, 187) along the longitudinal axis (504, 506, 507) with the lateral offset (508, 509) in a accordance with a second mode that comprises relative movement of the spout end to the container 85 in the opposite direction (e.g., front-to-back direction) to the first mode, where front is direction of forward travel of the transferring vehicle (91 or 191), or a second mode. For instance, the first mode or second mode is directional mode in which the relative position of the spout (89, 189) with respect to the container 85 moves to achieve a target fill level of material in the cells 308. The second mode of is in an opposite direction of relative movement between the spout (89, 189) and container 85 than the first mode. If the second mode is executed with spout movement in the front-to-back direction, the initial position of the spout (89, 189) or spout end (87, 187) is aligned with the front-most empty cell 308 (e.g., along the longitudinal axis with any lateral offset) within reach of the spout stream or flow of agricultural material, and may exclude a dead band region or dead band cells 308 at the front end 316 of the container 85 that may not be capable of readily filling to full target height.

Under an eight technique, the alignment module 24 or the data processor 94 adjusts dynamically (or is adapted to adjust dynamically for each sampling period) the longitudinal size that comprises a fixed deadband component (e.g., 311 in FIG. 14) that is static over time and a dynamic deadband component (312 in FIG. 14) that is dynamically adjusted based on the magnitude of relative velocity (or relative motion in the X direction 512).

Under a ninth technique, the alignment module 24 or the data processor 94 adjusts the lateral offset, where the lateral offset comprises a first lateral offset component 508 that is based on a slope of the ground (e.g., lateral slope or yaw, tilt, and/or roll of the container 85) or wind vector (e.g., wind speed and direction or lateral wind speed along the Y axis 510), and a second lateral offset component 509 (e.g., dynamically variable over each sampling interval) that is based on the magnitude of relative velocity in the Y direction.

Under a tenth technique, the alignment module 24 or a data processor 94 is arranged to update the first lateral offset component 508 at a lesser rate than the second lateral offset component 509.

Under an eleventh technique, the alignment module 24 or the spout control module 21 can direct the spout or spout end in the first mode or the second mode to adjust one or more spout actuators to control a direction of the spout (89, 189) or spout end (87, 187) in a generally horizontal plane of or parallel to the harvesting vehicle body, an elevation or azimuth of the spout (89, 189) or spout end (87, 187) above the generally horizontal plane, and/or an angle of a deflection member or deflector 306 at the spout end (87, 187).

Under a twelfth technique, the alignment module 24 or the applicable data processor 94 controls the speed and heading (e.g., yaw) of the transferring vehicle (91, 191) (e.g., harvesting vehicle) to achieve target relative speed and heading between the transferring vehicle (91, 191) and the container 85 associated with the receiving vehicle 79 that is consistent with aligning the spout (89, 189) with respect to the container 85 or a target fill zone within the container 85 to achieve the first target level, the second target level, or both.

Figure 9:
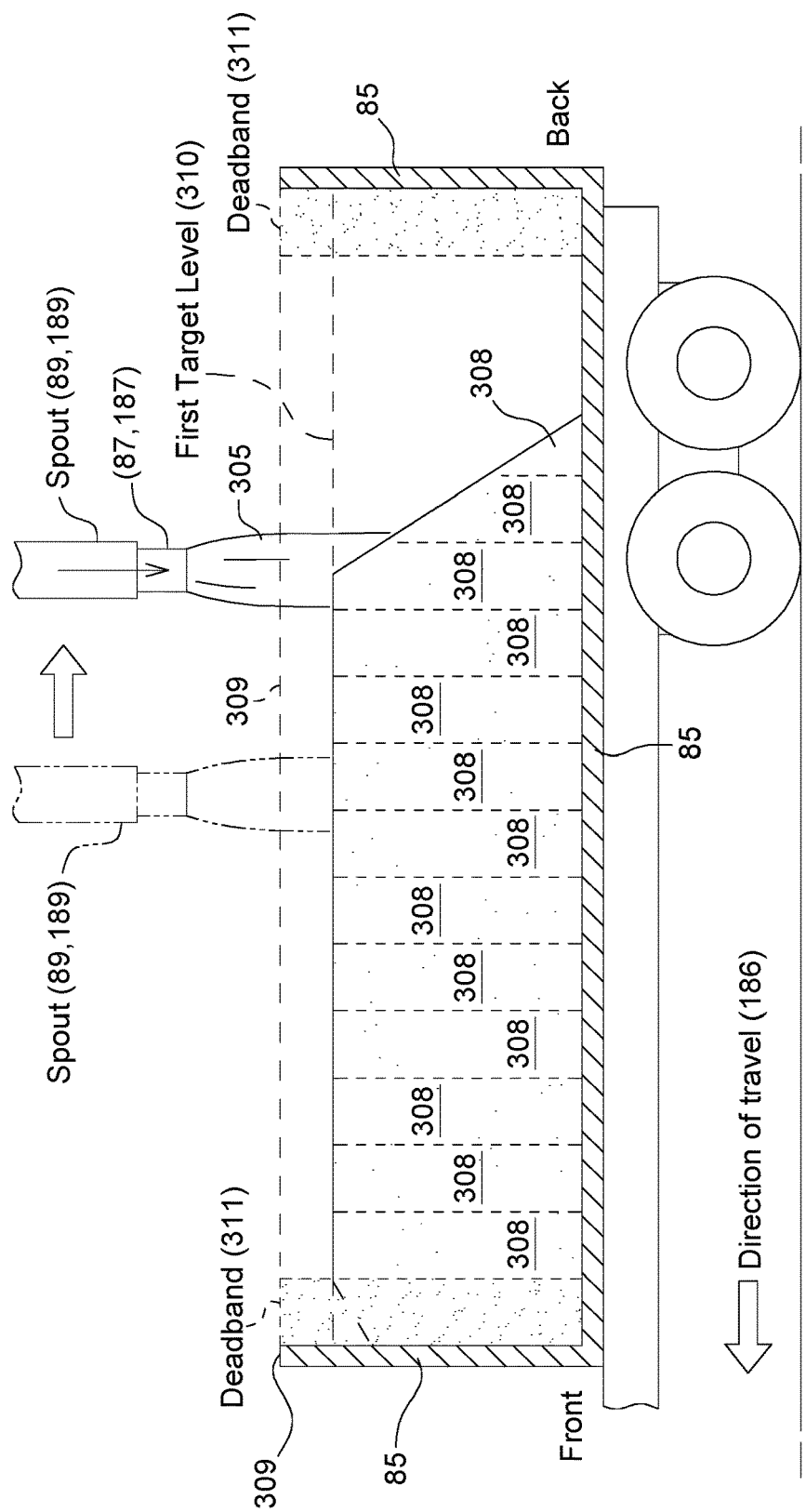
FIG. 9 shows one embodiment of a cross-sectional side view of the container and the spout in accordance with a first mode of the method of FIG. 8.

FIG. 9 shows an illustrative example of carrying out step S200. The receiving vehicle 79 and its container 85 are generally moving in the forward direction of travel 186 along with the transferring vehicle (91, 191), while the relative position of the spout (89, 189) or spout end (87, 187) moves in a first mode. As illustrated, the first mode is directional mode in which the relative position of the spout (89, 189) with respect to the container moves front-to-back (or opposite to the direction of travel 186) to achieve the first target level 310 for agricultural material 305 in the cells 308 or container 85. In one embodiment, the dead band regions 311 or dead band cells at the front and back of the container 85 are excluded from the evaluation of whether or not the agricultural material 305 satisfies or reaches the first target level 310. As illustrated in FIG. 9A, the spout (89, 189) or spout end (87, 187) is above partially full cells or the next empty cell as the target fill zone and is not in a dithering mode that is spaced apart from the next empty cell.

Figure 10:
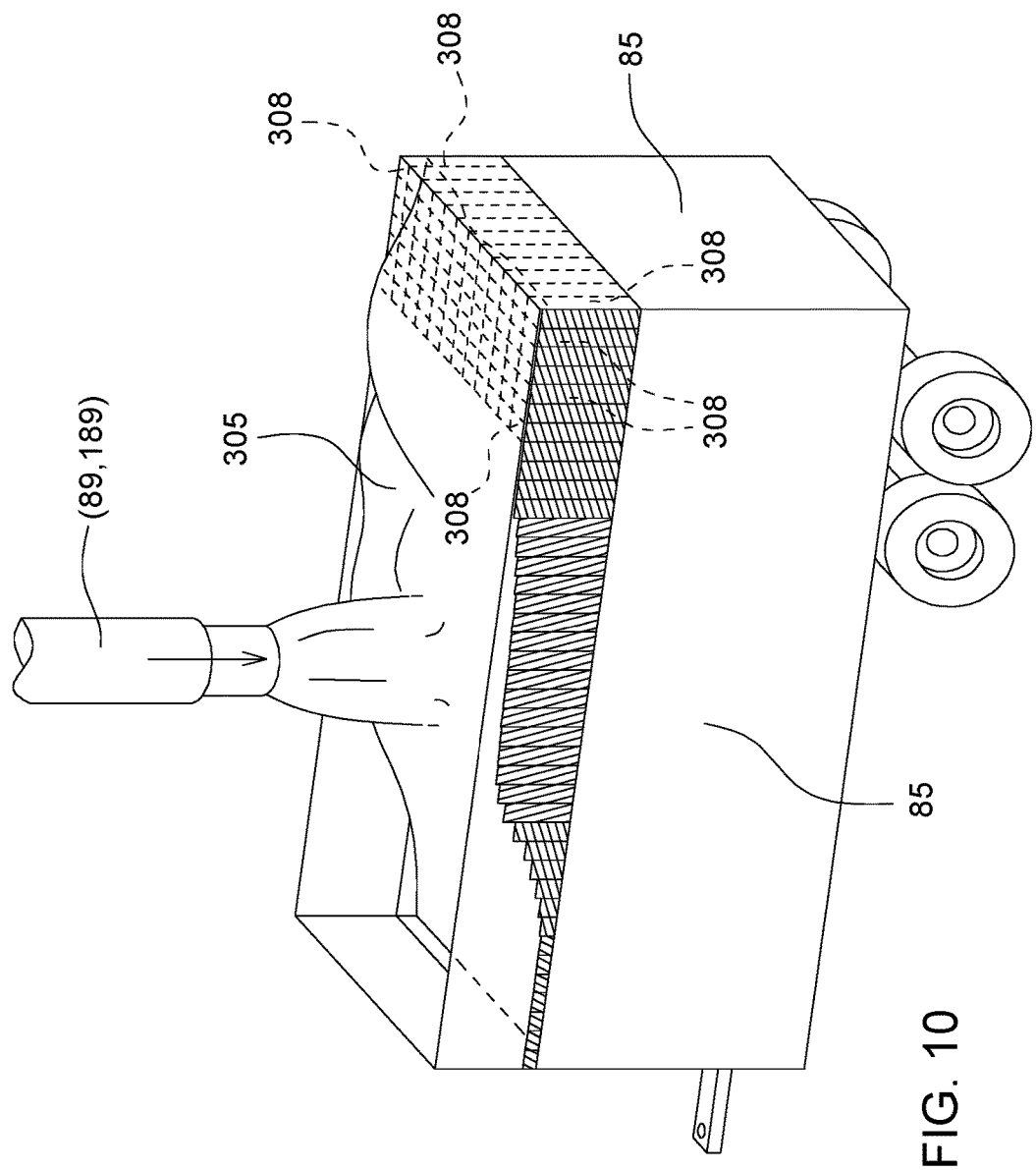
FIG. 10 shows an illustrative example of the cells within the container.

FIG. 10 illustrates the cells 308 as generally three dimensional columns or blocks of equal volume that are subdivisions of the interior volume of the container 85. The receiving vehicle 79 and its container 85 are generally moving in the forward direction of travel 186 along with the transferring vehicle, while the relative position of the spout (89, 189) or spout (89, 189) moves in a first mode. As illustrated, the first mode is directional mode in which the relative position of the spout (89, 189) with respect to the container moves back-to-front (e.g., in the same direction as the direction of travel) achieve the first target level.

FIG. 11 shows a plan view of the container 85 that is filled with material in accordance with the method of FIG. 8 or variants thereof. Although the container 85 is generally rectangular and has walls as illustrated, the container 85 may have another geometric shape (e.g., polygon or ellipse) in alternate embodiments. A deadband volume (311, 313, or both) is associated with a front end 316, a rear end 318 of the container 85, or both. As shown in FIG. 11, a front deadband volume 311 is associated with the front end 316 of the container and a rear deadband volume 313 is associated with the rear end 318 of the container 85. A longitudinal axis 504 extends between the front end 316 the rear end 318 of the container 85; the container 85 is divided into distinct, separate volumes or cells 308. A target point 502 intercepts or lies on the longitudinal axis 504. The target point 502 represents one or more of the following: (1) the position of the spout end (87, 187), or (2) where (e.g., defined by cell or cells 308 of the container 85 or material within) the material exiting the spout end (87, 187) lands or will land in the container 85.

FIG. 12 shows a plan view of the container 85 that is filled with material in accordance with the method of FIG. 8 or variants thereof. FIG. 12 is similar to FIG. 11, except FIG. 12 further illustrates an X axis 512, a Y axis 510, a lateral offset 508 of the longitudinal axis 504, and offset longitudinal axis 506. Like reference numbers in FIG. 11 and FIG. 12 indicate like elements.

The X-axis 512 is substantially perpendicular to the Y-axis 510. The X direction is coextensive with or substantially parallel to the X axis 512. The Y direction is coextensive with or substantially parallel to the Y axis 510. Y direction is substantially perpendicular to the X direction, and where the alignment module 24 is adapted to adjust the longitudinal size of the deadband volume (e.g., front deadband volume 311, the rear deadband volume 313, or both) based on the relative velocity or relative motion between the transferring and receiving vehicles in the X direction (or relative velocity or relative motion between the spout end and the container in the X direction).

The offset longitudinal axis 506 has a lateral offset 508 with the respect to the longitudinal axis 504. The offset longitudinal axis 506 is substantially parallel to the longitudinal axis 504. As illustrated, the target point 503 lies on or intercepts the offset longitudinal axis 506. In one embodiment, the lateral offset 508 or offset longitudinal axis 506 compensates for a wind vector (e.g., wind speed and direction or lateral wind speed), a slope (e.g. lateral slope or slope in multiple dimensions) of the terrain on which the receiving vehicle or container is operating, the yaw, tilt or roll of the container 85, or the uneven prior filling of the container 85 (e.g., as detected by a fill level estimator 21).

FIG. 13 shows a plan view of the container 85 that is filled with material in accordance with the method of FIG. 8 or variants thereof. FIG. 13 is similar to FIG. 12, except FIG. 13 further illustrates the components (508, 509) of the lateral offset. Like reference numbers in FIG. 12 and FIG. 13 indicate like elements.

As shown in FIG. 13, the lateral offset comprises a first lateral offset component 508 that is based on: (1) a slope of the ground, yaw, tilt and roll of the container, wind vector (e.g., wind speed and direction), lateral wind speed, and rating of evenness or uneven filling of the container 85, and (2) a second lateral offset component that is based on the magnitude of relative velocity in the Y direction. In some embodiments, alignment module 24 or a data processor 94 is arranged to update the first lateral offset component 508 at a lesser rate than the second lateral offset component 509. For example, the first lateral offset component 508 may be generally static or have a slower update rate than a second offset that is dynamically updated with a faster update rate than the slower update rate.

FIG. 14 shows a plan view of the container 85 that is filled with material in accordance with the method of FIG. 8 or variants thereof. FIG. 14 is similar to FIG. 11, except that FIG. 11 further comprises a supplemental deadband. Like reference numbers in FIG. 11 and FIG. 14 indicate like elements.

The longitudinal size comprises a fixed deadband component 311 that is static over time and a dynamic deadband component 312 that is dynamically adjusted based on the magnitude of relative velocity in the X direction. As illustrated in FIG. 14, the target point 502 is positioned inward into the container 85 from the fixed deadband 311 and the dynamic deadband 312. The longitudinal size or aggregate longitudinal size of total deadband, which comprises the fixed deadband 311 and dynamic deadband 312, is adjusted to prevent spill or filling inside the total deadband. In one embodiment, the fixed deadband 311, the dynamic deadband 312, or both are dynamically increased based on the magnitude of the relative velocity (e.g., between the receiving vehicle and the transferring vehicle, or between the spout end and the container) in the X direction or along the X-axis 512.

The system and method is well-suited for controlling the steering and speed of the transferring vehicle and the receiving vehicle via location determining receivers and wireless communication devices. Further, the system and method facilitates detection of how the container of the receiving vehicle is being filled to adjust the relative lateral alignment, and fore/aft alignment between the spout 89 or spout end 87 and the container perimeter 81 to achieve uniform filling or uniformly distributed height level of agricultural material within the container 85 or storage portion 93. Uniform filling of agricultural material within the container can be realized to minimize certain errors that might otherwise result from fatigue, inexperience or skill shortcomings of the operator of the vehicles, for example.

Figure 15:
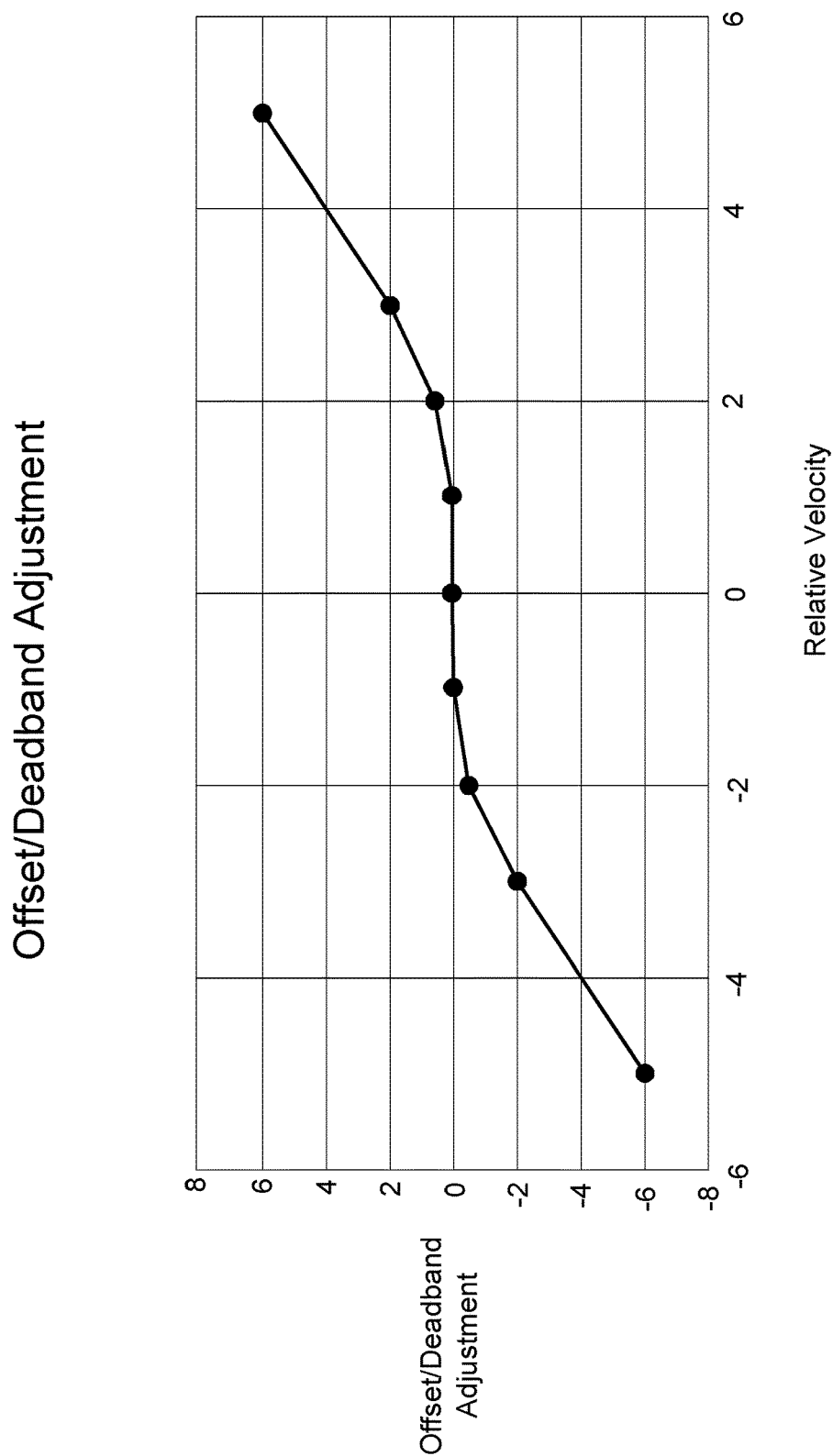
FIG. 15 is a chart or look-up table of longitudinal size of deadband adjustment versus relative velocity, or lateral offset versus relative velocity in accordance with the disclosure.

FIG. 15 is a chart or look-up table of longitudinal size of deadband adjustment versus relative velocity, or lateral offset versus relative velocity in accordance with the disclosure. The data processor 94 can make any of lateral adjustment, longitudinal size adjustment, or deadband adjustment disclosed in this document in accordance with the chart or look-up table similar to FIG. 15, or an equivalent mathematical function (e.g., quadratic equation or piecewise function).

The vertical axis of FIG. 15 represents the lateral offset of the longitudinal axis (504, 506) in the Y direction of the Y-axis 510, whereas the horizontal axis represents the relative velocity or relative motion between the receiving vehicle or transferring vehicle or between the container the spout end. Separately or cumulatively with the above assignment of axes, the vertical axis of FIG. 15 represents the longitudinal size (of one or more deadbands) in the X direction of the X-axis 512, whereas the horizontal axis represents the relative velocity or relative motion between the receiving vehicle or transferring vehicle or between the container the spout end.

The chart or look-up table of FIG. 15 is provided for illustrative purposes and is an example plot of unitless values showing the offset or deadband calculations. Other configurations of charts, look-up tables, and equivalent mathematical functions fall within the scope of the appended claims of this disclosure. Once the relative velocity or relative motion is determined or estimated, the data processor 94 can use the chart or table of FIG. 15 to determine the amount of dead band and offsets. As illustrated, the chart or table has an inflection point or threshold at a relative velocity of plus or minus 2, although the inflection point or threshold may be set at any other reasonable value, where the data processor 94 does not make adjustments to the longitudinal size or lateral offset for relative velocity or relative motion (changes) below the threshold. In certain embodiments, the threshold or inflection point may be used with or without hysteresis to avoid excessive switching between different longitudinal size and lateral offsets during adjacent sampling intervals.

In practice, the data processor 94 can execute the chart or table to interpolate in between the set points to give a smooth transition between various relative velocities or relative motion estimates between the receiving vehicle and the transferring vehicle, or between the spout end and the container. For instance, if the relative velocity exceeds the maximum table data points in FIG. 15, the closest data point is used.

Having described the preferred embodiment, it will become apparent that various modifications can be made without departing from the scope of the invention as defined in the accompanying claims.

The following is claimed:

1. A system for facilitating the transfer of agricultural material from a harvesting vehicle to a receiving vehicle, the system comprising:
   a receiving vehicle comprising a propelled portion for propelling the receiving vehicle and a container for storing agricultural material;
   a stereo imaging device facing towards the container of the receiving vehicle, the imaging device collecting image data;
   a deadband volume associated with a front end or a rear end of the container, a longitudinal axis extending between the front end the rear end of the container, the container divided into distinct, separate volumes or cells;
   a spout identification module for identifying a spout of the harvesting vehicle in the collected image data;
   a relative motion detector for detecting the relative motion of the receiving vehicle and the harvesting vehicle or for detecting the relative motion between the spout and the container of the receiving vehicle; and
   an alignment module for determining the relative position of the spout and the cells in the container such that the spout is aligned with the longitudinal axis or a lateral offset from the longitudinal axis based on the detected relative motion and where a longitudinal size of the deadband volume is adjusted based on the detected relative motion.

2. The system according to claim 1 wherein the relative motion comprises the relative velocity and relative acceleration of the receiving vehicle and the harvesting vehicle or the relative velocity and relative acceleration between the spout end and the container of the receiving vehicle.

3. The system according to claim 1 wherein the relative motion comprises the relative velocity of the receiving vehicle and the harvesting vehicle or the relative velocity between the spout end and the container of the receiving vehicle.

4. The system according to claim 3 where an X direction is coextensive with or substantially parallel to the longitudinal axis, where a Y direction is substantially perpendicular to the X direction, and where the alignment module is adapted to adjust the longitudinal size of the deadband volume based on the relative velocity in the X direction.

5. The system according to claim 4 wherein the alignment module is adapted to increase the longitudinal size of the deadband volume in response to an increase in the relative velocity in the X direction and wherein the alignment module is adapted to decrease the longitudinal size of the deadband volume based on a decrease in the relative velocity in the X direction.

6. The system according to claim 1 where an X direction is coextensive with or substantially parallel to the longitudinal axis, where a Y direction is substantially perpendicular to the X direction, and where the alignment module is adapted to adjust the lateral offset based on the relative velocity in the Y direction.

7. The system according to claim 6 wherein the alignment module is adapted to increase the lateral offset in response to an increase in the relative velocity in the Y direction and to decrease the lateral offset based on a decrease in the relative velocity in the Y direction.

8. The system according to claim 6 wherein the lateral offset is increased in response to an increase in the relative velocity in the Y direction and wherein the size of the deadband volume is increased in response to an increase in the relative velocity in the X direction.

9. The system according to claim 1 wherein the alignment module is arranged to direct in the spout end along the longitudinal axis with the lateral offset in accordance with a first mode that comprises relative movement of the spout end to the container in the front-to-back direction, where front is direction of forward travel of the harvesting vehicle.

10. The system according to claim 1 wherein the alignment module is arranged to direct the spout end along the longitudinal axis with the lateral offset in a accordance with a second mode that comprises relative movement of the spout end to the container is the back-to-front direction, where front is direction of forward travel of the harvesting vehicle, or a second mode.

11. The system according to claim 1 wherein the longitudinal size comprises a fixed deadband component that is static over time and a dynamic deadband component that is dynamically adjusted based on the magnitude of relative motion in the X direction.

12. The system according to claim 1 wherein the lateral offset comprises a first lateral offset component that is based on a slope of the ground or lateral wind speed, and a second lateral offset component that is based on the magnitude of relative motion in the Y direction.

13. The system according to claim 1 wherein alignment module or a data processor is arranged to update the first lateral offset component at a lesser rate than the second lateral offset component.

14. A method for facilitating the transfer of agricultural material from a harvesting vehicle to a receiving vehicle, the method comprising:
    collecting image data by a stereo imaging device facing towards a container of a receiving vehicle;
    establishing, by a data processor, a deadband volume associated with a front end or a rear end of the container, a longitudinal axis extending between the front end the rear end of the container, where the container divided into distinct, separate volumes or cells;
    identifying, by a spout identification module a spout of a harvesting vehicle in the collected image data;
    detecting, by a relative velocity detector, the relative velocity of the receiving vehicle and the harvesting vehicle or detecting the relative velocity between the spout and the container of the receiving vehicle; and
    determining, by an alignment module, the relative position of the spout and the cells in the container such that the spout is aligned with the longitudinal axis or a lateral offset from the longitudinal axis based on the detected relative velocity and where a longitudinal size of the deadband volume is adjusted based on the velocity.

15. The method according to claim 14 further comprising:
    adjusting the longitudinal size of the deadband volume based on the relative velocity in an X direction, where the X direction is coextensive with or substantially parallel to the longitudinal axis, where a Y direction is substantially perpendicular to the X direction.

16. The method according to claim 15 wherein the adjusting further comprises increasing the longitudinal size of the deadband volume in response to an increase in the relative velocity in the X direction and decreasing the longitudinal size of the deadband volume based on a decrease in the relative velocity in the X direction.

17. The method according to claim 14 further comprising:
    adjusting the lateral offset based on the relative velocity in the Y direction, where an X direction is coextensive with or substantially parallel to the longitudinal axis, and where a Y direction is substantially perpendicular to the X direction.

18. The method according to claim 17 wherein the adjusting comprises increasing the lateral offset in response to an increase in the relative velocity in the Y direction and decreasing the lateral offset based on a decrease in the relative velocity in the Y direction.

19. The method according to claim 17 wherein the adjusting comprises increasing the lateral in response to an increase in the relative velocity in the Y direction and increasing the longitudinal size of the deadband volume in response to an increase in the relative velocity in the X direction.

20. The method according to claim 14 further comprising:
    directing the spout end along the longitudinal axis with the lateral offset in accordance with a first mode that comprises relative movement of the spout end to the container in the front-to-back direction, where front is direction of forward travel of the harvesting vehicle.

21. The method according to claim 14 further comprising:
    directing the spout end along the longitudinal axis with the lateral offset in a accordance with a second mode that comprises relative movement of the spout end to the container is the back-to-front direction, where front is direction of forward travel of the harvesting vehicle, or a second mode.

22. The method according to claim 14 further comprising:
    adjusting dynamically the longitudinal size that comprises a fixed deadband component that is static over time and a dynamic deadband component that is dynamically adjusted based on the magnitude of relative velocity in the X direction.

23. The method according to claim 14 wherein the lateral offset comprises a first lateral offset component that is based on a slope of the ground or lateral wind speed, and a second lateral offset component that is based on the magnitude of relative velocity in the Y direction.

24. The method according to claim 14 wherein alignment module or a data processor is arranged to update the first lateral offset component at a lesser rate than the second lateral offset component.

* * * * *